US012303728B1

(12) United States Patent
Workman et al.

(10) Patent No.: US 12,303,728 B1
(45) **Date of Patent: *May 20, 2025**

(54) SYSTEMS AND METHODS FOR FIRE PROTECTION OF HORIZONTAL INTERSTITIAL SPACES WITH EXPANDED LOCALIZED HEAT DETECTION AREAS

(71) Applicants: Viking Group, Inc., Caledonia, MI (US); Minimax Viking Patent Management GmbH, Bad Oldesloe (DE)

(72) Inventors: Martin H. Workman, Delton, MI (US); Scott T. Franson, Hastings, MI (US); James E. Golinveaux, Ada, MI (US)

(73) Assignees: Viking Group, Inc., Caledonia, MI (US); Minimax Viking Patent Management GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/027,333

(22) Filed: Jan. 17, 2025

Related U.S. Application Data

(63) Continuation of application No. 18/894,149, filed on Sep. 24, 2024, which is a continuation of application
(Continued)

(51) Int. Cl.
*A62C 2/10* (2006.01)
*A62C 35/60* (2006.01)
(Continued)

(52) U.S. Cl.
CPC ................ *A62C 2/10* (2013.01); *A62C 37/11* (2013.01); *A62C 35/60* (2013.01); *A62C 35/62* (2013.01)

(58) Field of Classification Search
CPC .... A62C 2/06; A62C 2/10; A62C 3/00; A62C 3/14; A62C 35/58; A62C 35/60;
(Continued)

(56) References Cited

U.S. PATENT DOCUMENTS

| | | | |
|---|---|---|---|
| 5,669,449 | A | 9/1997 | Polan et al. |
| 8,083,002 | B1 | 12/2011 | Golinveaux et al. |

(Continued)

FOREIGN PATENT DOCUMENTS

| | | |
|---|---|---|
| WO | WO 2007/109454 | 9/2007 |
| WO | WO 2015/195974 | 12/2015 |

OTHER PUBLICATIONS

International Searching Authority, International Search Report and Written Opinion in International Appln. No. PCT/US2019/054775, Apr. 28, 2020, 21 pages.
Globe Fire Sprinkler Corp., Technical Datasheet, Specific Application Model "IC" Interstitial Combustible Concealed Space Upright Sprinkler GL 5608, GFC-600, Oct. 2017, 6 pp.
(Continued)

*Primary Examiner* — Darren W Gorman
(74) *Attorney, Agent, or Firm* — Perkins Coie LLP

(57) ABSTRACT

Fire protection systems and methods provide for the protection of horizontal concealed interstitial spaces of either a solid wood joist, open bar joist or open truss construction system. The systems and methods provide and locate fire protection sprinklers to define localized heat detection areas that are over 1000 sq. ft., at least 2000 sq. ft., over 2000 sq. ft. and/or otherwise unconfined by draft curtains or other barriers.

30 Claims, 15 Drawing Sheets

Related U.S. Application Data

No. 18/102,016, filed on Jan. 26, 2023, now Pat. No. 12,151,128, which is a continuation of application No. 16/643,800, filed as application No. PCT/US2019/054775 on Oct. 4, 2019, now Pat. No. 11,590,371.

(60) Provisional application No. 62/741,883, filed on Oct. 5, 2018, provisional application No. 62/804,099, filed on Feb. 11, 2019.

(51) Int. Cl.
*A62C 37/11* (2006.01)
*A62C 35/62* (2006.01)

(58) Field of Classification Search
CPC ......... A62C 35/62; A62C 37/11; A62C 37/12; A62C 37/14; A62C 99/0072; A62C 99/009
See application file for complete search history.

(56) References Cited

U.S. PATENT DOCUMENTS

| | | | |
|---|---|---|---|
| 10,675,492 | B1 | 6/2020 | Silva, Jr. et al. |
| 2011/0024138 | A1 | 2/2011 | Multer et al. |
| 2016/0375287 | A1 | 12/2016 | Meyer |
| 2017/0165511 | A1 | 6/2017 | Meyer et al. |
| 2018/0256929 | A1 | 9/2018 | Williams et al. |
| 2018/0318620 | A1 | 11/2018 | Cutting et al. |
| 2021/0353988 | A1 | 11/2021 | Desrosier et al. |

OTHER PUBLICATIONS

The Viking Corporation, Technical Data, Coin Quick Response Upright Sprinkler VK950, Form No. F-81216, Rev. 17.3, Oct. 5, 2017, 10 pp.

Tyco Fire Products LP, Datasheet Model CC2—4.2 and 5.6 K-factor Combustible Concealed Space Sprinklers™ Specific Application, Upright, TFP 632, Mar. 2014, 8 pages.

Tyco Fire Products LP, Datasheet Model CC2—4.2 and 5.6 K-factor Combustible Concealed Space Sprinklers™ Specific Application, Upright, TFP 632, Dec. 2018, 8 pages.

SYSTEMS AND METHODS FOR FIRE PROTECTION OF HORIZONTAL INTERSTITIAL SPACES WITH EXPANDED LOCALIZED HEAT DETECTION AREAS

PRIORITY CLAIM & INCORPORATION BY REFERENCE

This application is a continuation of U.S. patent application Ser. No. 18/894,149, filed Sep. 24, 2024, which is a continuation of U.S. patent application Ser. No. 18/102,016, filed Jan. 26, 2023, now U.S. Pat. No. 12,151,128, granted Nov. 26, 2024, which is a continuation of U.S. patent application Ser. No. 16/643,800, filed Mar. 2, 2020, now U.S. Pat. No. 11,590,371, granted Feb. 28, 2023, which is a 35 U.S.C. § 371 application of International Application No. PCT/US2019/054775, filed Oct. 4, 2019, which claims the benefit of U.S. Provisional Applications No. 62/741,883 filed Oct. 5, 2018, and 62/804,099 filed Feb. 11, 2019, each of which identified applications is incorporated by reference in its entirety.

TECHNICAL FIELD

The present invention relates generally to fire protection systems and methods for horizontal interstitial concealed spaces.

BACKGROUND ART

One example of an interstitial concealed space in need for fire protection is the interstitial space between floors of a building, i.e., a combustible interstitial concealed space. Such concealed spaces can be constructed using truss systems in which parallel truss members are spaced apart from one another at on-center spacing that can range from twelve inches to 24 inches (12-24 in.). The truss members support an upper deck and/or a lower deck, for example an upper floor and ceiling, in a spaced apart relationship with the horizontal interstitial space defined in between. Each truss member can be fabricated from wood or steel and generally includes a top chord, a bottom chord with one or more angled, open web members extending in between the chord member in which the chord members may be parallel or pitched.

Concealed spaces can also be constructed using joist systems in which parallel joist members are spaced apart from one another at the on-center spacing to support the upper and lower decks in the spaced apart relationship. Each support member in the joist construction system generally includes an upper joist member to support the upper deck and a separate lower joist member that is axially spaced from and aligned with the upper joist member to support the lower deck in the spaced apart relationship. There are three types of joist construction systems: (i) solid wood joists; (ii) composite wood joists; and (iii) open bar joists. In solid wood joist construction, each of the supporting members is a solid wood member of rectangular cross-section. Generally, the members are oriented so that the narrowest edge of the members forms a supporting surface for the deck. In composite wood joist construction, each supporting member is a wood beam of I-beam cross-section with an upper flange component, a bottom flange component and a narrower solid wood web element in between to join the upper and bottom flange components. In composite wood joist construction, each I-beam is oriented with the broadest surface of either the upper or lower component of the I-beam supporting the deck surface. In open bar joist construction, supporting joist members consist of steel truss-shaped members. Alternatively, bar joist can be constructed from wood top and bottom chords with open steel tube or bar webs in between. Regardless of the type of concealed space construction, insulation or other blocking material can be installed in the spaces between parallel upper joist members or upper parallel chords to a depth than that is equal to that of the respective upper supporting component.

Interstitial space fire protections systems generally include a piping network that extends in the space between the support members to supply firefighting fluid to a plurality of spaced apart automatic fire protection sprinklers coupled to the piping network. Fire protection installations are generally subject to industry accepted fire code requirements and the approval of the "authority having jurisdiction" (AHJ) to ensure compliance with the applicable codes and requirements. Known commercially available automatic fire protection sprinklers and systems for the protection of concealed interstitial spaces require that the space be divided such that every one thousand square feet (1000 sq. ft.) of area that is protected by such sprinklers and systems is surrounded by a perimeter of heat collection baffles, draft curtains or solid walls that will not allow heat to escape the 1000 square foot area. One exception to the perimeter requirement is where the interstitial space is formed by a solid wood or composite joist construction system having non-combustible solid filled insulation between supporting joist members of the upper deck and the piping network of the fire protection system is of steel piping. The sprinklers and their relative spacing define these localized heat detection spaces in which the sprinklers can individually and collectively detect the heat release from a fire heat and collected by the surrounding baffles. Sprinklers thermally actuated, in response to the heat release, distribute firefighting fluid to address the fire. One known commercially available automatic fire protection sprinkler for the protection of concealed interstitial spaces is shown in Technical Data Sheet Form No. F_081216 Rev. 17.3: COIN Quick Response Upright Sprinkler VK950 (Specific Application) from The Viking Corporation of Hastings, MI.

For a fire sprinkler system to be approved for concealed space protection it is typically demonstrated to the AHJ that the system and its equipment, including its fire protection sprinklers, are suitable for such performance. To facilitate the AHJ approval process, fire protection equipment can be "listed," which as defined by NFPA 13, means that the equipment is included in a list by an organization that is acceptable to the AHJ and whose list states that the equipment "meets appropriate designated standards or has been tested and found suitable for a specified purpose." Listing and approving organization includes, Underwriters Laboratories Inc. ("UL") and FM Approvals LLC. Applicable standards for concealed space sprinklers and fire protections sprinklers generally include: (i) "UL 199: Automatic Sprinklers for Fire-Protection Service" (11 ed.) (Rev. Mar. 14, 2008) ("UL199"); (ii) "UL 199H: Outline of Investigation for Fire Testing of Specific Application Sprinklers for Use In Horizontal Concealed Spaces-Issue No. 1" (Feb. 17, 2014) ("UL199H"); and "Approval Standard for Automatic Sprinklers for Fire Protection—Class Number 2000" (February 2018) ("FM 2000") from FM Approvals LLC. The various standards provide the water distribution and fire test requirements to establish that a given sprinkler is suitable for automatic fire protection sprinklers generally and for concealed space fire protection.

The installation, listing and/or approval guidelines and standards require consideration of several characteristics of the sprinkler for application and compliance. Sprinkler characteristics include: the orifice size or nominal K-factor of the sprinkler, the installation orientation (pendent or upright), the thermal sensitivity or response time index (RTI) rating of the sprinkler, the sprinkler deflector details and the sprinkler spacing or coverage. Generally, automatic fire protection sprinklers include a solid metal body connected to a pressurized supply of water, and some type of deflector spaced from the outlet to distribute fluid discharged from the body in a defined spray distribution pattern over the area to be protected. The discharge or flow characteristics from the sprinkler body is defined by the internal geometry of the sprinkler including its internal passageway, inlet and outlet (the orifice). As is known in the art, the K-factor of a sprinkler is defined as $K=Q/P^{1/2}$, where Q represents the flow rate (in gallons per minute (GPM)) of water from the outlet of the internal passage through the sprinkler body and P represents the pressure (in pounds per square inch (psi)) of water or firefighting fluid fed into the inlet end of the internal passageway though the sprinkler body.

The spray pattern or distribution of a firefighting fluid from a sprinkler defines sprinkler performance. Several factors can influence the water distribution patterns of a sprinkler including, for example, the shape of the sprinkler frame, the sprinkler orifice size or discharge coefficient (K-factor), and the geometry of the deflector. The deflector is typically spaced from the outlet of the body. The deflector geometry is particularly significant since the deflector is the main component of the sprinkler assembly and to a great extent, defines the size, shape, uniformity, and water droplet size of the spray pattern.

To control fluid discharge from the sprinkler body is a fusible or thermally responsive trigger assembly which secures a seal over the central orifice. When the temperature surrounding the sprinkler is elevated to a pre-selected value indicative of a fire, the trigger assembly releases the seal and water flow is initiated through the sprinkler head. The thermal sensitivity of the trigger assembly and sprinkler is measured or characterized by Response Time Index ("RTI"), measured in units of $(m\text{-}s)^{1/2}$. Under the FM 2000 standard, an RTI of 80 $(m\text{-}s)^{1/2}$ to 350 $(m\text{-}s)^{1/2}$ [145-635 $(ft.\text{-}s)^{1/2}$] with a Conductivity factor (C-factor) of 2.0 $(m/s)^{1/2}$ [3.62 $(f/s)^{1/2}$] or less defines a "Standard Response Sprinkler; and an RTI equal to or less than 50 $(m\text{-}s)^{1/2}$ [90 $(ft.\text{-}s)^{1/2}$] with a C-factor of 1.0 $(m/s)^{1/2}$ [1.81 $(f/s)^{1/2}$] or less defines a "Quick Response Sprinkler."

For large interstitial concealed spaces over 1000 sq. ft. and more particularly for areas up to an over 2000 sq. ft., fire protection installations, depending on the construction, require placement of baffles to divide the interstitial space into 1000 sq. ft. areas localized heat detection areas or installation of appropriate blocking, which can increase the complexity and cost of construction. Accordingly, there is a need for fire protection sprinklers and systems that either expand the localized heat detection area and/or reduce the construction costs.

DISCLOSURE OF INVENTION

Preferred sprinklers, systems and methods provide for the protection of horizontal concealed interstitial spaces of either a solid wood joist, open bar joist or open truss construction system. Embodiments of the preferred fire protection sprinklers and systems include a thermally responsive trigger and fluid deflecting member that can define localized heat detection areas that are larger than previously known thereby reducing the number of heat collecting baffles required to confine the localized heat detection space and divide the interstitial space. In particular, preferred systems and methods locate the thermally responsive actuating triggers and fluid deflecting members of the sprinklers within the interstitial concealed space to provide a preferred means for defining a localized heat detection area of over 1000 sq. ft., preferably over 1500 sq. ft., more preferably at least 2000 sq. ft., and even more preferably over 2000 sq. ft., so as to have a localized heat detection space that is unconfined. For such preferred unconfined localized heat detection spaces, the construction system excludes solid wood or composite joist construction system having non-combustible solid filled insulation between supporting joist members of the upper deck and when the fire protection piping network is of steel piping. The preferred systems include a sprinkler-to-sprinkler spacing and sprinkler positioning that locates the thermally responsive triggers to provide a preferred arrangement of heat detection elements. Moreover, the fluid deflecting members individually define the spray pattern shape and discharge density for effectively addressing concealed space fires. The preferred sprinkler-to-sprinkler spacing combines and overlaps the spray patterns of adjacent actuated sprinklers to define a collective spray density and pattern that effectively addresses a fire within the interstitial space. In addition, the collective spray pattern and fluid density of the actuated sprinklers effectively controls the fire to stop the escape of the fire or heat, thereby expanding a draft curtain perimeter of localized heat detection, or in some embodiments, eliminating the need for any draft curtain or other heat collection baffle.

Preferred embodiments of a fire protection system are provided for protecting a localized heat detection space of a horizontal interstitial concealed space between a ceiling and an upper deck supported by either a solid wood joist, open bar joist or open truss construction system. The construction system includes a plurality of support members supporting the upper deck and the ceiling in a spaced apart relationship. The preferred system includes a network of pipes including a main pipe extending parallel to the plurality of support members and a plurality of branch pipes coupled to the main pipe and extending perpendicular to the support members. A plurality of spaced apart automatic fire protection sprinklers are preferably coupled to the network of pipes and located within the concealed space to define a preferred maximum area of localized heat detection space of over one thousand square feet (1,000 sq. ft.), more preferably over 1,500 sq. ft., even more preferably at least 2,000 sq. ft., and yet even more preferably over 2,000 sq. ft. Preferred embodiments of the system include a barrier, such as for example, to define a perimeter about the maximum area of localized heat detection space.

In alternate embodiments of preferred systems and methods, the localized heat detection area is unconfined by barriers. One preferred system for protecting a horizontal interstitial space of over one thousand square feet (1,000 sq. ft.) between a ceiling and an upper deck supported by either a solid wood joist, open bar joist or open truss construction system preferably includes a network of pipes disposed within the horizontal interstitial space and including a main pipe extending and a plurality of branch pipes coupled to the main pipe. A plurality of spaced apart automatic fire protection sprinklers are disposed within the horizontal interstitial space and coupled to the plurality of branch lines. The plurality of sprinklers protects the interstitial space of over 1,000 square feet with an unconfined localized heat detection space. A preferred method of fire protection of a horizontal interstitial concealed space between a ceiling and an upper deck supported by either a solid wood joist, open bar joist or open truss construction system, above the ceiling, in which the construction system including a plurality of support members supporting the upper deck and the ceiling in a spaced apart relationship includes coupling a plurality of automatic fire protection sprinklers to a network of pipes within the concealed space; and defining a localized heat detection space having a maximum area of over one thousand square feet (1,000 sq. ft.) and more preferably up to and over 2000 sq. ft., by locating the plurality of automatic fire protection sprinklers within the concealed space. Preferred embodiments of the method include forming a perimeter about the maximum area of the localized heat detection space with a barrier. Another preferred method of fire protection of a horizontal interstitial space includes obtaining a plurality of automatic fire protection sprinklers; and providing the plurality of automatic fire protection sprinklers for installation and location within the interstitial space to define a maximum area of localized heat detection space of over one thousand square feet (1,000 sq. ft.), more preferably over 1,500 sq. ft., even more preferably at least 2,000 sq. ft., and yet even more preferably over 2,000 sq. ft.

Other preferred embodiments of a fire protection system for protecting a horizontal interstitial space of over one thousand square feet (1,000 sq. ft.) between a ceiling and an upper deck supported by either a solid wood joist, open bar joist or open truss construction system include a network of pipes are disposed within the horizontal interstitial space having a main pipe extending and a plurality of branch pipes coupled to the main pipe; and a plurality of spaced apart automatic fire protection sprinklers disposed within the horizontal interstitial space and coupled to the plurality of branch lines, the plurality of sprinklers protecting the interstitial space of over 1,000 square feet with an unconfined localized heat detection space. Another preferred method of protecting a horizontal interstitial space of over one thousand square feet (1,000 sq. ft.) between a ceiling and an upper deck supported by either a solid wood joist, open bar joist or open truss construction system includes disposing a network of pipes within the interstitial space that includes a main and a plurality of branch pipes coupled to the main pipe; and coupling a plurality of automatic fire protection sprinklers to the network of pipes within the horizontal interstitial space to protect the interstitial space with an unconfined localized heat detection space. Other preferred methods can include providing the plurality of automatic fire protection sprinklers for installation within the interstitial space at a sprinkler-to-sprinkler spacing and minimized operating pressure sufficient to protect the horizontal interstitial space with unconfined localized heat detection spaces. Another preferred method of protecting a horizontal interstitial space between a lower deck and an upper deck supported by a joist construction system includes obtaining a plurality of automatic fire protection sprinklers; and providing the plurality of automatic fire protection sprinklers for installation within the interstitial space at a sprinkler-to-sprinkler spacing and minimized operating pressure sufficient to protect a localized heat detection space of the horizontal interstitial space as having a maximum area of two-thousand square foot (2,000 sq. ft.).

Another preferred method is provided for protecting a horizontal interstitial space between a lower deck and an upper deck supported by an open bar joist or open truss construction system. The preferred construction system includes a plurality of steel or wood truss members each having a top chord supporting the upper deck and a bottom chord supporting the ceiling or lower deck with open web members extending between the top and bottom chords. The preferred method includes obtaining a plurality of automatic fire protection sprinklers; and providing the plurality of automatic fire protection sprinklers for installation within the interstitial space at a sprinkler-to-sprinkler spacing and minimized operating pressure sufficient to protect a localized heat detection space of the horizontal interstitial space as having a maximum area of two-thousand square foot (2,000 sq. ft.).

Preferred embodiments of systems and methods for protecting a localized heat detection space of a horizontal interstitial space includes a first pair of pair of spaced apart draft curtains extending parallel to the support members and a second pair of spaced apart draft curtains extending perpendicular to the first pair of spaced apart draft curtains to form a perimeter of a two-thousand square foot (2,000 sq. ft.) maximum area of the localized heat detection space. A network of pipes is disposed within the perimeter and includes a main pipe extending parallel to the plurality of support members and a plurality of branch pipes coupled to the main pipe that extend perpendicular to the support members. A plurality of spaced apart automatic fire protection sprinklers are disposed within the perimeter and coupled to the plurality of branch lines to protect the localized heat detection area.

Another fire protection system for protecting a localized heat detection space of a horizontal interstitial space between a ceiling and an upper deck supported by either a solid wood joist, open bar joist or open truss construction system includes a network of pipes including a main pipe extending parallel to the plurality of support members and a plurality of branch pipes coupled to the main pipe and extending perpendicular to the support members; and a plurality of spaced apart automatic fire protection sprinklers coupled to the plurality of branch lines to define a maxim area of a confined localized heat detection space as being up to a maximum of two-thousand square feet (2,000 sq. ft.). Another preferred method of protecting a localized heat detection space of a horizontal interstitial space between a ceiling and an upper deck supported by either a solid wood joist, open bar joist or open truss construction system includes providing a network of pipes within the horizontal interstitial space, the network including a main pipe and a plurality of spaced apart branch pipes coupled to the main pipe; and coupling spacing a plurality of automatic fire protection sprinklers to the network of pipes and spacing them apart to defining a maximum area of the localized heat detection space as being over one thousand square feet (1,000 sq. ft.).

In another preferred aspect, a plurality of sprinklers are provided for protection of a horizontal interstitial space between a ceiling and an upper deck supported by either a solid wood joist, open bar joist or open truss construction system. The plurality of sprinklers include sprinkler bodies with each sprinkler body having an inlet and an outlet with a passageway disposed therebetween along a sprinkler axis and a nominal K-factor ranging from 2.8-11.2 [GPM/(psi) $^{1/2}$]. Operational components are coupled to the sprinkler bodies with the sprinkler bodies being spaced apart with respect to one another to locate the operational components to define a localized heat detection space having a maximum area of up to 2000 sq. ft. and preferably over 2000 sq. ft.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
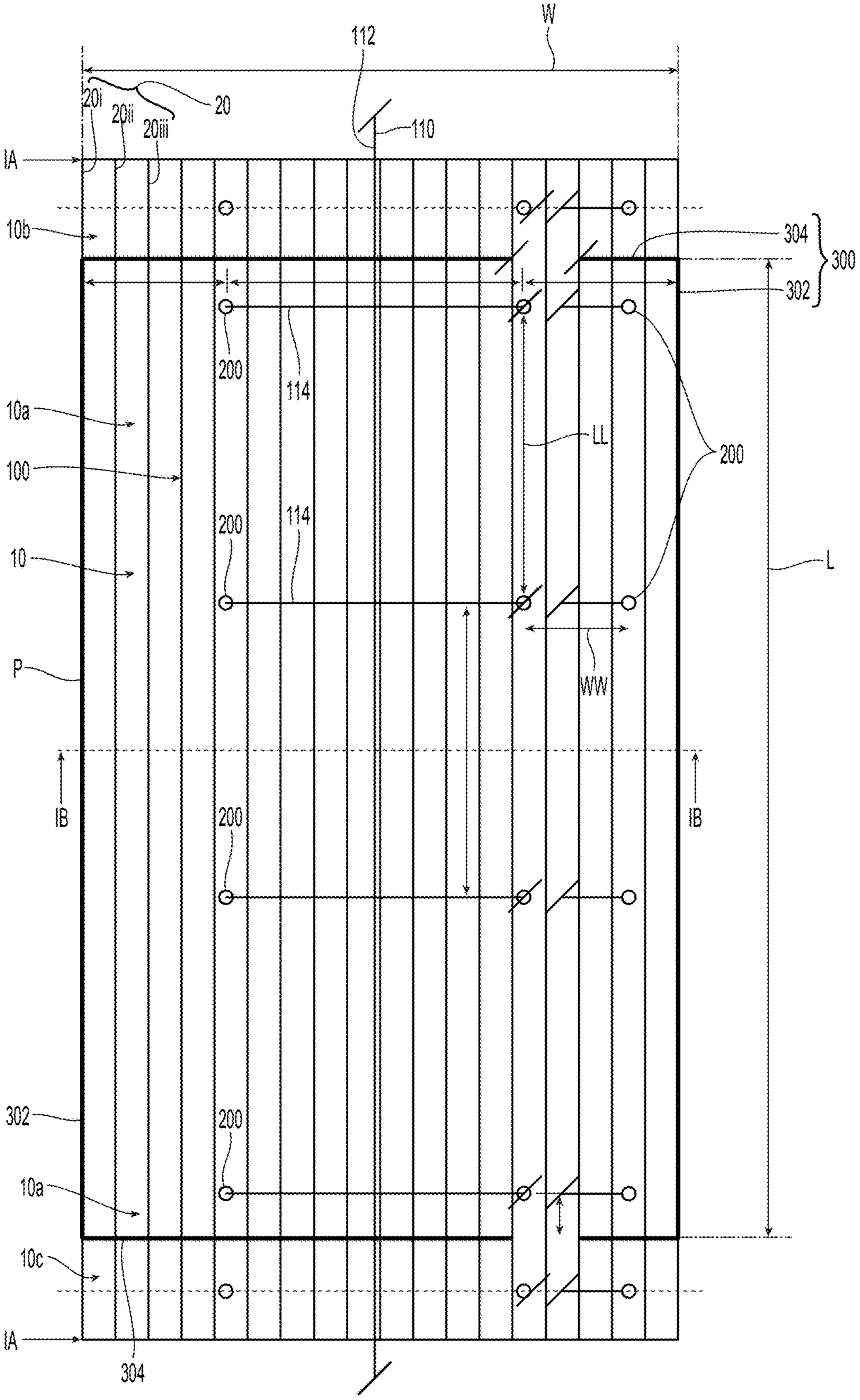
FIG. 1 is a schematic plan view of a fire protection system for an interstitial concealed space.
Figure 1A:
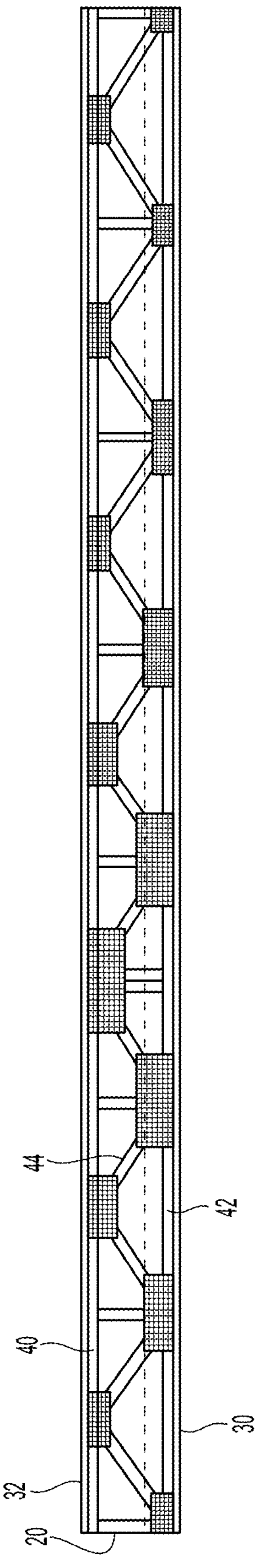
FIGS. 1A-1B are side-views of a truss construction using the system of FIG. 1.
Figure 1B:
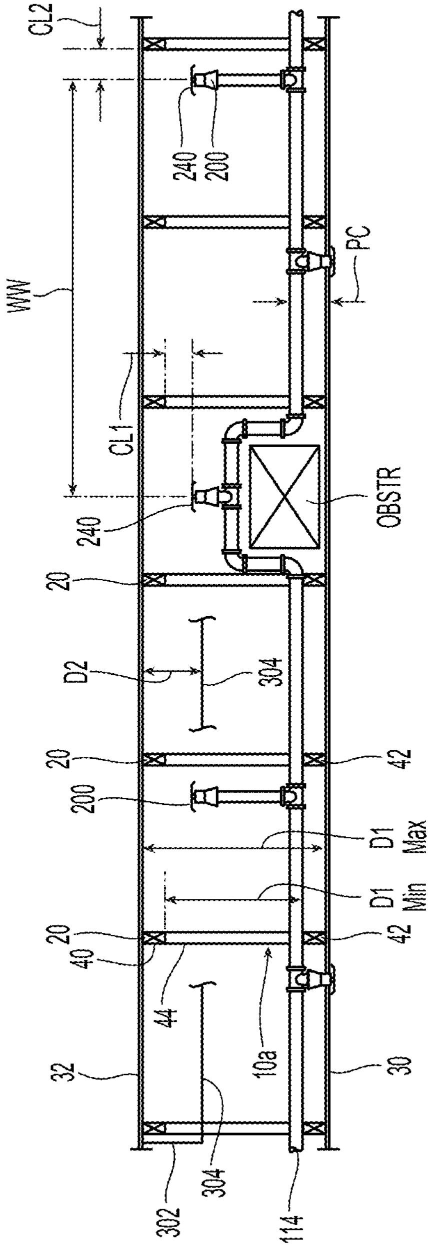

Shown in FIG. 1 is a preferred fire protection sprinkler system 100 for the protection of a horizontal concealed interstitial space 10 defined by a plurality of support members 20 spaced apart at a preferred regular interval, such as for example, on-center spacing that can range from twelve inches to twenty-four inches (12-24 in.). With reference to FIG. 1B, shown are support members 20 (20*i*, 20*ii*, 20*iii*, . . . 20*n*) in a spaced apart from one another about the interstitial space 10, a lower deck or ceiling 30 and an upper deck or roof 32 disposed above the ceiling 30 in a spaced apart relationship. For the horizontal interstitial spaces described herein, the upper deck defines a roof pitch of no more than nine degrees (9°) or 2 inches of rise for every 12 inches of run (2/12). The support members 20 defining the concealed interstitial space 10 are preferably constructed as part of either a solid wood joist, open bar joist or open truss construction system. FIGS. 1A and 1B, show an illustrative preferred open wood truss construction system in which each support member 20, as seen for example in includes a top chord 40, a bottom chord 42 with one or more web members 44 extending in between. In alternate embodiments described herein, the support members can be part of a joist construction system, as seen for example in the preferred solid wood joist systems of FIGS. 3A, in which the upper deck 32 is supported by an upper floor joist member 140 and the lower deck 30 is supported by lower ceiling framing or lower joist member 142. As shown, the solid wood joist system is one in which the upper and lower joist members are integral beam or plank members of substantially rectangular cross-section with the narrow edge of the beam abutting the deck surface. Insulation or blocking material, if present between the spaced apart upper floor joist members 140, is non-combustible.

To protect the interstitial space 10, the preferred fire protection system 100 includes a piping network 110 that extends in the space between support members and the upper and lower decks to supply firefighting fluid to a plurality of spaced apart automatic fire protection sprinklers 200 coupled to the piping network. Generally, within the interstitial space 10 a central main supply line 112 of the piping network 110 extends parallel to the support members 20 with perpendicular branch line piping 114 routed between upper and lower support components. Preferred embodiments of the system 100 and its piping network 110 can be configured with CPVC piping or alternatively with steel piping. Additional sprinklers can be coupled to the piping network 110 to protect areas outside the interstitial space 10*a*. The preferred sprinklers 200 described herein provide a preferred means for defining one or more preferred localized heat detection areas 10*a* of the total interstitial space 10 for protection by the system 100. Preferred means include a thermally responsive trigger and fluid deflecting member to detect a fire and actuate the sprinkler in order to provide a fluid discharge and spray pattern for effectively addressing the fire with a preferred density of firefighting fluid. For preferred embodiments of the system described herein, the sprinklers 200 are located to defining a localized heat detection space having a maximum area of over one thousand square feet (1,000 sq. ft.), preferably up to a maximum of at least two thousand square feet (2,000 sq. ft.) and yet even more preferably over two thousand square feet (2,000 sq. ft.).

Forming a preferred perimeter to separate the one or more localized heat detection areas 10*a* from adjacent areas 10*b*, 10*c* are barriers 300 such as for example fire stops, solid walls, heat collection baffles or draft curtains, which extend from the upper deck 30 down into the interstitial space 10*a*. As shown in FIG. 1, a preferred arrangement of a first pair of spaced apart barriers 302 extend parallel to the plurality of truss members 20 to define the length L of the localized heat detection area 10*a*. A second pair of spaced apart barriers 304 extend perpendicular to the first pair of spaced apart barriers 302 define a width W of the localized heat detection area 10*a* and form a preferred rectangular perimeter P. The barriers 300 preferably extend from the upper deck 30 into the interstitial space 10*a* to a preferred depth that is a function of the depth of the interstitials space measured in the direction from the upper deck to the lower ceiling deck. In particular, the barriers 300 have a preferred depth that is the greater of eight inches (8 in.) or 1/3 the depth of the interstitial space 10. The preferred localized heat detection area 10*a* is larger than those under commercially available fire protection installations. For the preferred systems described herein, the localized heat detection area is preferably larger than 1000 sq. ft., preferably greater than 1500 sq. ft., more preferably at least 2000 square feet and even more preferably greater than 2000 sq. ft. The localized heat detection area is preferably rectangular, but it should be understood that the heat detection area can define alternate geometries, such as for example, trapezoidal, triangular or circular. Moreover, for alternative embodiments of the system 100, the localized heat detection areas defined by the sprinklers 200 are effectively large, regardless of the size of the interstitial space to be protected, such that barriers 300 are not needed and can therefore be eliminated. As such, preferred embodiments of the system can provide for unconfined localized heat detection areas.

Shown in FIG. 1B is one preferred embodiment of the system 100 for the protection of an interstitial space 10*a* of an open wood truss construction that includes an obstruction OBSTR, i.e., an obstructed wood truss construction. The branch piping 114 is bent and sprinkler(s) 200 are positioned around the obstruction OBSTR. The piping 110 of the system 100 can be steel piping for use in the protection of either the obstructed or open truss member construction. In a preferred embodiment of the system 100 for the protection of an interstitial space formed by obstructed truss member construction with a maximum depth D1-Max of 60 inches, as seen in FIG. 1B, the system piping 110 is preferably made of CPVC piping.

Figure 2:
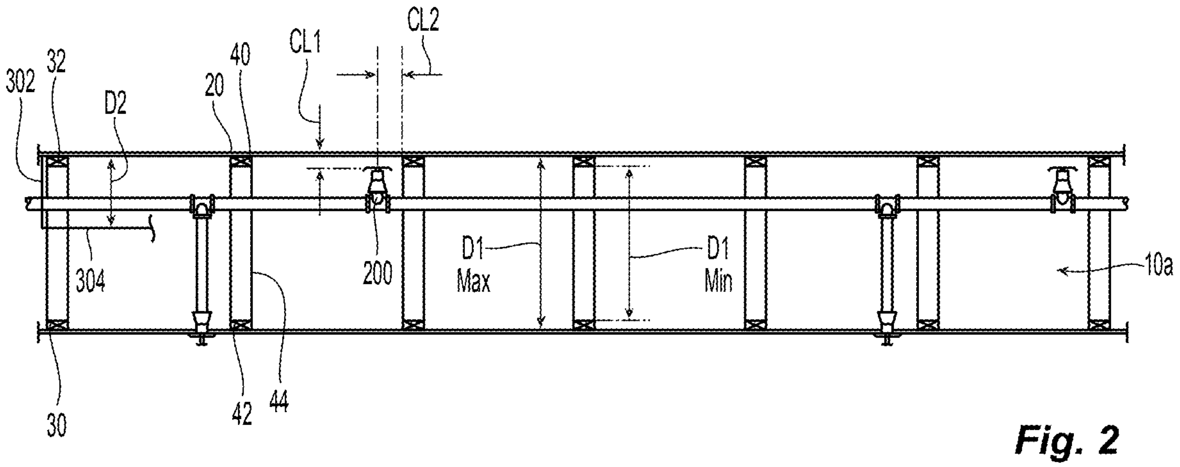
FIGS. 2-3 are alternate concealed space truss constructions for protection by the system in FIG. 1.

Shown in FIG. 2 is an alternate embodiment truss construction, an open wood truss construction, in which there is no obstruction. For the preferred system 100, the depth of interstitial space 10 preferably ranges from a maximum depth D1-Max of 60 inches measured from an inner surface of the upper deck 32 to an inner surface of the ceiling 30 to a minimum depth D1-Min of 6 inches from a bottom surface of the top chord 40 to a top surface of the bottom chord 42. The location and width of the bottom and top surfaces of the chords 40, 42 can be defined by the installed orientation of the chords 40, 42. Generally, the top and bottom chords are constructed from plank or frame members having a rectangular cross-section in which the wider dimension defines the face of the chord and the narrower thickness defines the edge of the chord. For example, in a chord member having a two inch thickness and four inch width (2 in.×4 in.), the wider surface define the preferred face of the chord and the narrower surface defines the edge of the chord. For certain preferred embodiments of the system 100, the installed orientation of chords can preferably be a function of the localized heat detection area. For example, for localized heat detection areas over 1000 sq. ft., the top and bottom chords are preferably oriented and installed with the wider face of the chords defining the respective top and bottom surfaces of the opposed chords 40, 42. Thus, for top and bottom chords installed on face, their faces oppose one another. Alternatively, for localized heat detection areas over 1000 sq. ft., the top and bottom chords can be oriented and installed with the narrower edge of the chords defining the respective top and bottom surfaces of the opposed chords 40, 42 provided an insulation is installed between top chords. For localized heat detection areas of 1000 sq. ft. or less, the top and bottom chords can preferably be oriented with the narrower edge of the chords defining the respective top and bottom surfaces of the opposed chords. Thus, for top and bottom chords installed on edge, their edges oppose one another.

Figure 3:
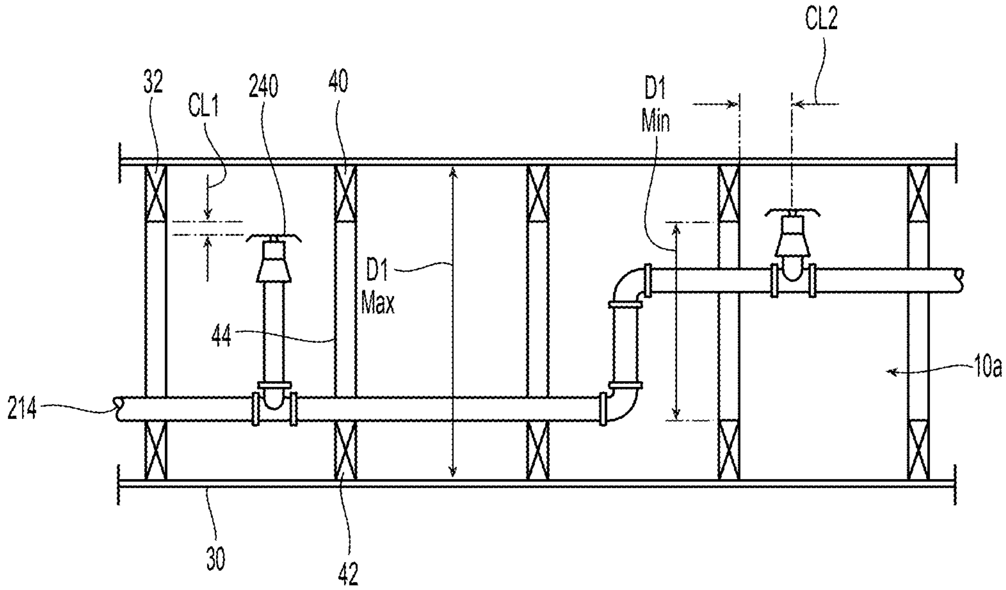

Either of the interstitial spaces shown in FIG. 1B, FIG. 2 or FIG. 3 can be alternately constructed using an open bar joist construction system in which the web or entire truss member is made of steel. Shown in FIG. 3 is another embodiment of an obstructed open wood truss construction in which the depth of interstitial space 10 preferably ranges from a maximum depth D1-Max of 84 inches measured from an inner surface of the upper deck 32 to an inner surface of the ceiling 30 to a minimum depth D1-Min of 6 inches from a bottom surface of the top chord 40 to a top surface of the bottom chord 42. For such a construction, the upper chord 40 itself has a preferred depth of over four inches (4 in.).

Figure 3A:
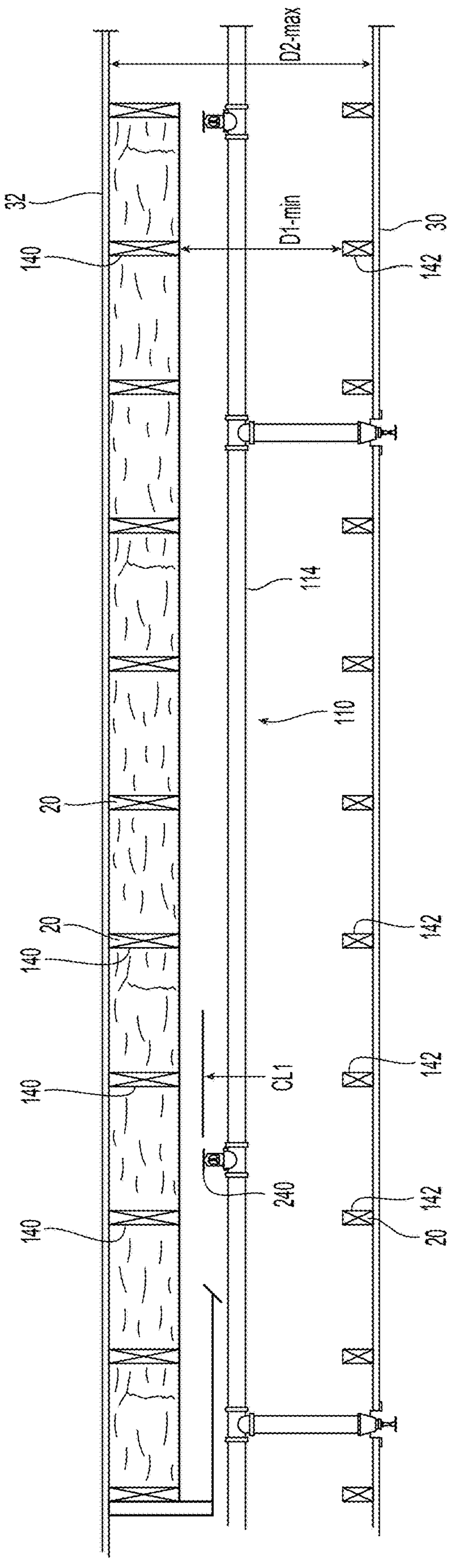
FIG. 3A is an alternate concealed space solid wood joist construction for protection by the system in FIG. 1.

Shown in FIG. 3A is one preferred alternative embodiment of the system 100 for the protection of an interstitial space 10*a* of a solid wood joist construction in which each of the spaced apart support members 20 include an upper floor joist member 140 and a separate lower ceiling framing joist member 142. As shown, the upper joist members 140 supports the upper deck 32 and the lower joist members 142 supports the lower deck 30. Preferably disposed between parallel upper joist members 40 is a blocking material such as, for example, wood or an insulation that is not a non-combustible insulation. Generally, the upper and lower joists are constructed from plank or frame members having a rectangular cross-section in which the wider dimension defines the face of the chord and the narrower thickness defines the edge of the joist. Preferably, the upper and lower joists 140, 142 are oriented with the narrower edges of the joists defining the respective top and bottom surfaces of the opposed joists. Thus, for the upper and lower joists installed on edge, their edges oppose one another.

The upper and lower joist members 140, 142 are axially spaced apart from one another to define the depth of the interstitial space 10. The depth of interstitial space 10 preferably ranges from a maximum depth D1-Max of 84 inches measured from an inner surface of the upper deck 32 to an inner surface of the ceiling 30 to a minimum depth D1-Min that is measured from a bottom surface of the upper joist member 140 to a top surface of the bottom joist member 142. The minimum depth D1-Min preferably ranges from six to sixty inches (6-60 in.). Although the interstitial space 10 of FIG. 3A is shown without an obstruction, the piping system 110 and branch piping 112 can be configured in a manner as previously described to accommodate an obstruction.

Preferably, the piping defines a maximum piping-to-ceiling clearance distance PC that can range from and is more preferably, no more than the smaller of, six inches (6 in.) to ⅓ the depth from the ceiling 30 to the upper deck 32 as seen, for example, in FIG. 1B. The piping 110 of the system 100 is sized to provide the sprinklers 200 with a preferred working pressure of firefighting fluid that ranges from 7 psi. to 175 psi. The system 100 can be configured as a wet pipe system in which the firefighting is supplied to the sprinklers 200 in the unactuated or stand-by state of the system 100. Alternatively, the system 100 can be configured as a dry or preaction in which the firefighting fluid delivery to the sprinklers is delayed by appropriate valving and interlocked fire or smoke detectors.

The branch pipes 114 are of a length and spaced from one another to spaces the sprinkler 200 at a preferred sprinkler-to-sprinkler spacing (WW×LL) based upon the sprinkler coverage and the preferred fluid delivery density. In one preferred embodiment of the system 100, each of the preferred interstitial space sprinklers 200 has a preferred maximum area of coverage of 256 sq. ft. to provide a preferred fluid flow density over the interstitial area of at least 0.10 gpm/sq. ft. To axially space the sprinklers 200 in the direction of the truss members 20, the branch pipes 114 are preferably axially spaced apart parallel from one another to define a branch pipe spacing that ranges from six to sixteen feet (6 ft. to 16 ft.). The sprinklers are preferably spaced apart along the branch lines at a preferred linear spacing that ranges from six to sixteen feet (6 ft. to 16 ft.). Accordingly, the sprinklers are located at a preferred sprinkler-to-sprinkler spacing that ranges from 6 ft. to 16 ft. Thus, the preferred sprinkler defines a range of sprinkler-to-sprinkler spacings and sprinkler coverage areas that can range from a minimum of 6 ft.×6 ft. (36 sq. ft. of coverage), or from a more preferred minimum of 8 ft.×8 ft. (36 sq. ft. of coverage) to a maximum of 16 ft.×16 ft. (256 sq. ft.) with any combination of spacing in between varying of whole foot increments. More preferably, the sprinklers 200 are positioned at a preferred sprinkler-to-sprinkler spacing of 6 ft.×16 ft.

In addition to locating the sprinklers 200 relative one another, the piping network 110 also locates the operative components of the sprinklers, such as for example the sprinkler thermally responsive trigger and/or its fluid deflecting member, within the concealed space. Preferred embodiments of the sprinklers 200 of the system 100 include a fluid deflecting member 240. Piping 110 is configured to locate the fluid deflecting member 240 preferably based upon the truss member construction. For example, in one preferred embodiment of a wood truss construction defining an interstitial space of sixty inches or less as shown for example in FIG. 2, the piping 110 locates the fluid deflecting member 240 to define a first axial clearance distance CL1 to the upper deck 32 that preferably ranges from a minimum 1½ inch to a maximum of four inches (4 in.). In obstructed wood truss construction, or truss member construction in which the top chord has a depth of over four inches (4 in.) and/or the depth D1 of the space is at the maximum 84 inches as seen in FIG. 3, the piping 110 locates the fluid deflecting member 240 to define a first clearance distance CL1 to the bottom of the top chord 40 upper deck 30 that preferably ranges from a minimum 1½ inch to a maximum of two inches (2 in.). Similarly, in a preferred solid wood joist system, as seen in FIG. 3A, the piping 110 locates the fluid deflecting member 240 to define a first clearance distance CL1 to the bottom of the upper joist member 140 that preferably ranges from a minimum 1½ inch to a maximum of two inches (2 in.). In another preferred aspect of the system piping 110, the piping 110 locates the sprinkler 200 fluid deflecting member 240 and its center to define a second lateral clearance distance CL2, as seen for example in FIG. 2, to a lateral surface of an adjacent top chord 40 that is preferably no smaller than 4½ inch.

By appropriately locating the thermally responsive actuating triggers and fluid deflecting members of the sprinklers 200 within the interstitial concealed space 10, the sprinklers 200 provide a preferred means for defining a localized heat detection area 10*a* of over 1000 sq. ft., preferably over 1500 sq. ft., more preferably at least 2000 sq. ft., and even more preferably over 2000 sq. ft. The previously described preferred sprinkler-to-sprinkler spacing and sprinkler positioning locates the thermally responsive triggers to provide a preferred arrangement of heat detection elements. Moreover, for any actuated sprinklers, the actuated sprinklers individually define the spray pattern shape and discharge density for effectively addressing the fire. The sprinkler-to-sprinkler spacing combines and overlaps the spray patterns of adjacent actuated sprinklers to define a collective spray density and pattern that effectively addresses a fire with the interstitial space. In addition, the collective spray pattern and fluid density of the actuated sprinklers effectively controls the fire to stop escape of the fire thereby expanding the draft curtain perimeter of localized heat detection.

Given the variable sprinkler-to-sprinkler spacings and expandability of the localized heat detection area 10*a* previously described, the systems are preferably hydraulically configured based upon a hydraulic remote area. The hydraulic remote area can be defined by a fixed area or alternatively, a calculated area based upon a specified number of remote sprinklers at a designed sprinkler-to-sprinkler spacing depending upon which is greater depending on the support member construction, type of piping being used and/or the system configuration. i.e., wet or dry. For preferred embodiments of the system 100 in a truss or bar joist construction the hydraulic remote area is preferably determined as the greater between (i) a fixed area of 1000 sq. ft. or (ii) six sprinklers multiplied by a selected sprinkler-to-sprinkler spacing. For preferred embodiments of a wet system 100 in a solid wood joist construction, the hydraulic remote area is preferably determined by six (6) sprinklers multiplied by a selected sprinkler-to-sprinkler spacing. For preferred embodiments of a dry steel pipe system 100 in a solid wood joist construction, the hydraulic remote area is preferably determined by fifteen (15) sprinklers multiplied by a selected sprinkler-to-sprinkler spacing. The preferred horizontal concealed interstitial space fire protection systems are hydraulically designed to provide the preferred density of 0.1 gpm/sq. ft. over the determined hydraulic design or remote area. Given the determined remote area and the fluid density requirement, the total fluid flow and flow per sprinkler requirement can be calculated. With the fluid flow per sprinkler determined, the hydraulic minimum fluid operating pressure requirement for each sprinkler is determined from its discharge characteristics and the function $P=[K/Q]^2$. Additionally, or alternatively, regardless of the calculated minimum fluid operating pressure P, for preferred embodiments of the system, the minimum fluid operating pressure is preferably no smaller than 7 psi.

Provided below is a preferred matrix of minimum fluid operating pressures for various sprinkler-to-sprinkler spacings for a preferred sprinkler 200 having a nominal K-factor of 5.6 $[GPM/(psi.)^{1/2}]$ when used in system 100 for protection of an interstitial space in an open wood truss, open bar joist or solid wood joist construction system:

TABLE

| Pressure vs. Sprinkler-to-Sprinkler Spacing | | | | | | | | | |
|---|---|---|---|---|---|---|---|---|---|
| Ft. (m) | Minimum Operating Pressure [PSI (bar)] | | | | | | | | |
| 16 (4.8) | 7 (0.4) | 7.2(0.4) | 8.2(0.5) | 10.3(0.7) | 12.8(0.8) | 14.1(0.9) | 16.9(1.1) | 18.4(1.2) | 21.6(1.4) |
| 15 (4.5) | 7 (0.4) | 7 (0.4) | 7.2(0.4) | 9.2(0.6) | 10.3(0.7) | 12.8(0.8) | 14.1(0.9) | 16.9(1.1) | 18.4(1.2) |
| 14 (4.2) | 7 (0.4) | 7 (0.4) | 7 (0.4) | 8.2(0.5) | 9.2(0.6) | 10.3(0.7) | 12.8(0.8) | 14.1(0.9) | 16.9(1.1) |
| 13 (3.9) | 7 (0.4) | 7 (0.4) | 7 (0.4) | 7 (0.4) | 8.2(0.5) | 9.2(0.6) | 10.3(0.7) | 12.8(0.8) | 14.1(0.9) |
| 12 (3.6) | 7 (0.4) | 7 (0.4) | 7 (0.4) | 7 (0.4) | 7 (0.4) | 8.2(0.5) | 9.2(0.6) | 10.3(0.7) | 12.8(0.8) |
| 11 (3.3) | 7 (0.4) | 7 (0.4) | 7 (0.4) | 7 (0.4) | 7 (0.4) | 7 (0.4) | 8.2(0.5) | 9.2(0.6) | 10.3(0.7) |
| 10 (3.0) | 7 (0.4) | 7 (0.4) | 7 (0.4) | 7 (0.4) | 7 (0.4) | 7 (0.4) | 7 (0.4) | 8.2(0.5) | 8.2(0.5) |
| 9 (2.7) | 7 (0.4) | 7 (0.4) | 7 (0.4) | 7 (0.4) | 7 (0.4) | 7 (0.4) | 7 (0.4) | 7 (0.4) | 7.2(0.4) |
| 8 (2.4) | 7 (0.4) | 7 (0.4) | 7 (0.4) | 7 (0.4) | 7 (0.4) | 7 (0.4) | 7 (0.4) | 7 (0.4) | 7 (0.4) |

TABLE-continued

| Pressure vs. Sprinkler-to-Sprinkler Spacing | | | | | | | | |
|---|---|---|---|---|---|---|---|---|
| Ft. (m) | Minimum Operating Pressure [PSI (bar)] | | | | | | | |
| Ft. | 8 (2.4) | 9 (2.7) | 10 (3.0) | 11 (3.3) | 12 (3.6) | 13 (3.9) | 14 (4.2) | 15 (4.5) | 16 (4.8) |

In the case where the hydraulic remote area is based upon a fixed area of 1000 sq. ft. and 0.1 gpm/sq. ft. density requirement, the number of remote sprinklers required to hydraulically satisfy the 7 psi. minimum requirement can be determined based upon a selected sprinkler-to-sprinkler spacing. Where the hydraulic area is defined by a preferred number of remote sprinklers at a combination of differing sprinkler-to-sprinkler spacings that defines an area of 144 sq. ft. or more, the remote sprinklers are to satisfy a minimum operating pressure that preferably ranges from just over 7 psi. to about 21 psi. just under 22 psi. in accordance with the above table. Otherwise, where the sprinkler-to-sprinkler spacing between remote sprinklers is at 12 ft.×12 ft. or defines an area under 144 sq. ft., the minimum operating pressure to be satisfied is preferably a minimum 7 psi.

In order to verify the suitability of the preferred size of localized heat detection areas, fire tests have been conducted demonstrating adequate performance by test sprinklers installed within a concealed interstitial test space to define a preferred localized heat detection area of over 1000 sq. ft. Generally, the test space was constructed with a plurality of support members spaced apart from one another to support an upper and lower deck and define interstitial space in between. Test sprinklers were installed within the test space and coupled to branch line fluid supply piping at a preferred sprinkler-to-sprinkler spacing. Barriers in the form of draft curtains were installed about the sprinklers to define the preferred localized heat detection space of over 1000 sq. ft. and in another test the localized heat detection space was unconfined by constructing the test space without draft curtains. Additional test sprinklers were disposed within the adjacent concealed space areas exterior to the draft curtains, where applicable, and the localized heat detection test space. A test fuel package was located in the concealed space disposed between and preferably centered between two or more sprinklers. In one particular test arrangement, the test fuel package is disposed between four sprinklers. One or more truss members proximate the fuel package was loaded to the maximum design load of the truss members. The fuel package was ignited resulting in one or more test sprinklers actuating. Water was permitted to be discharged from the sprinkler for at least 30 minutes. The test sprinklers demonstrated sufficient concealed space protection performance. More particularly, the test sprinklers and the system arrangement demonstrated localized heat detection and fire control performance by actuating in a timely manner and by sufficiently wetting the space and the fuel package such that the loaded support members do not collapse and the external test sprinklers are not thermally operated.

Figure 4:
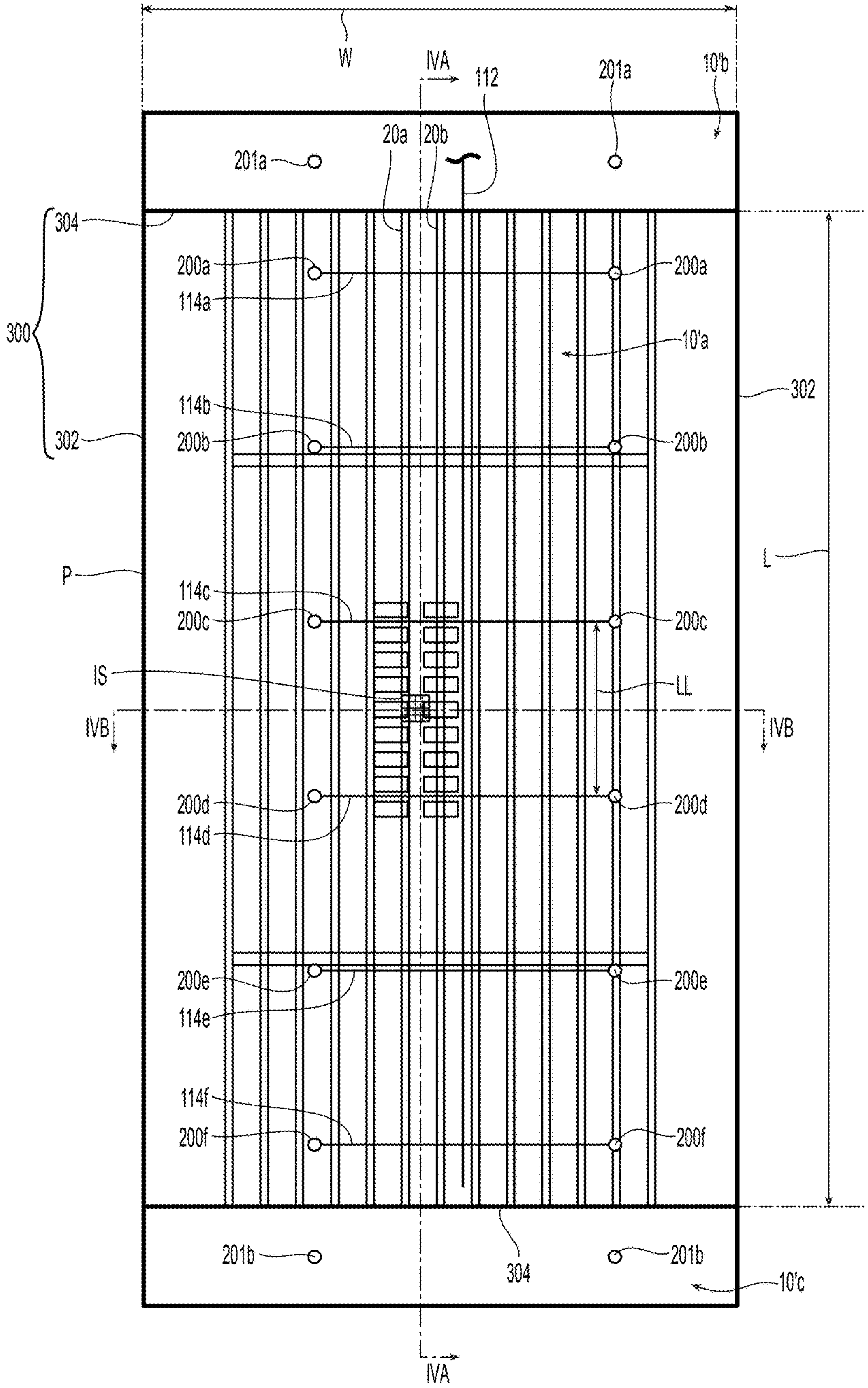
FIG. 4 is a schematic plan view of a preferred embodiment of a fire test set-up for testing the system of FIG. 1.
Figure 4A:
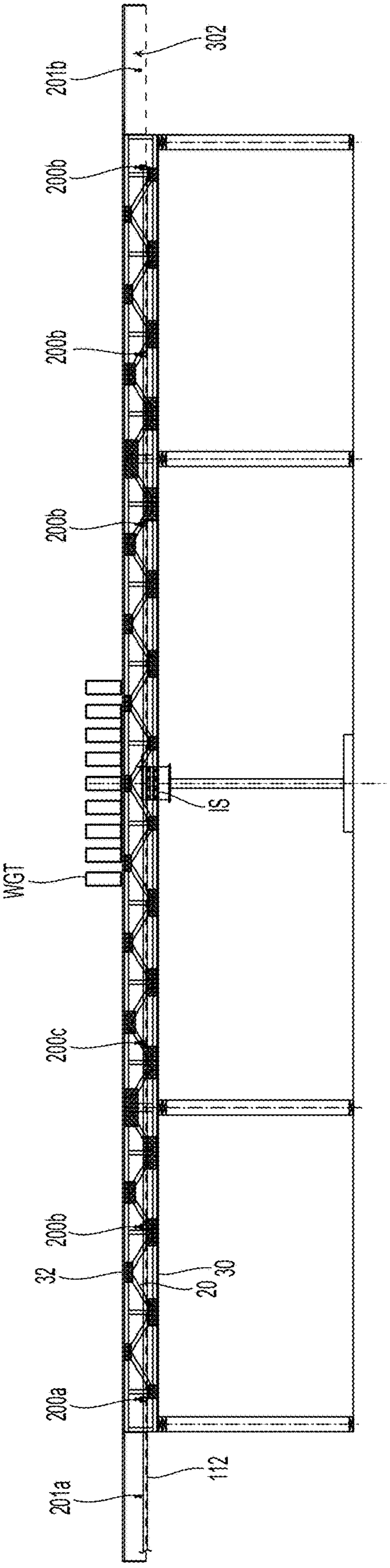
FIGS. 4A-4B are side views of the fire test set-up of FIG. 4.
Figure 4B:
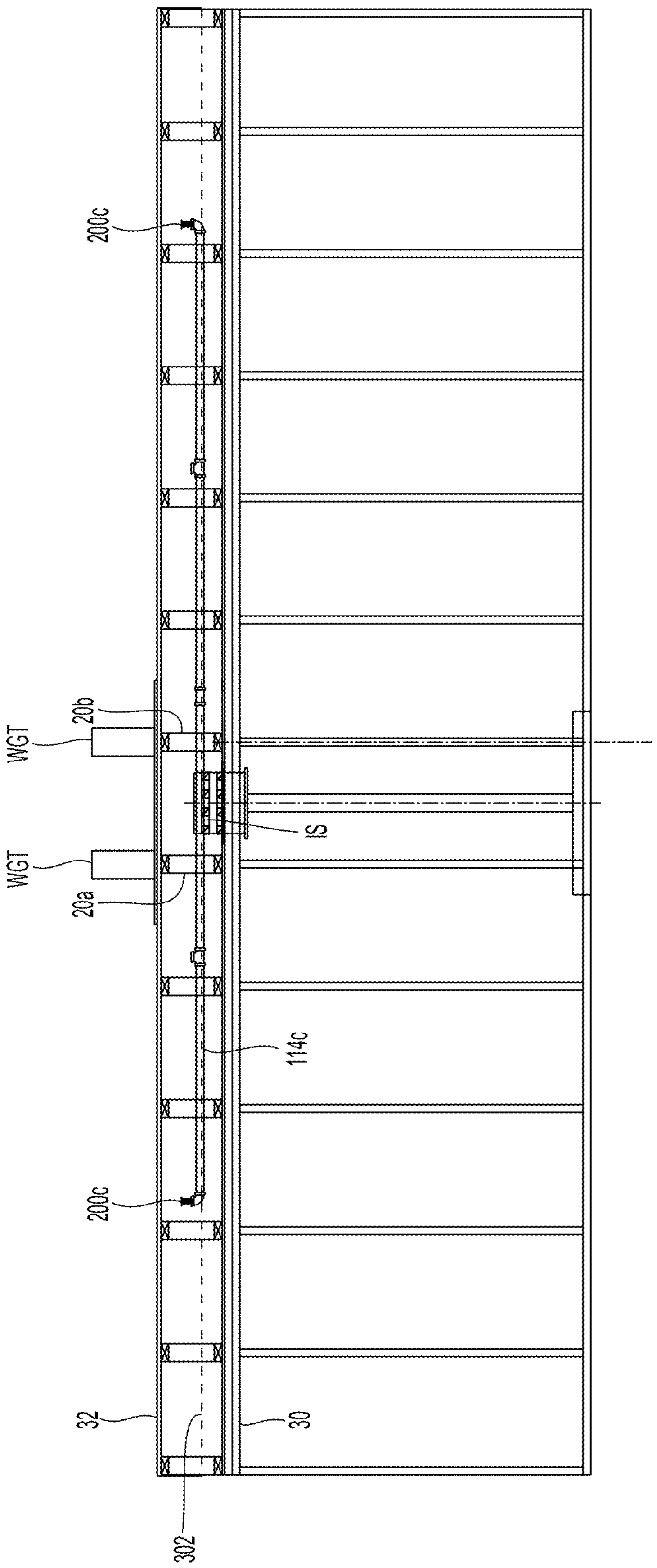

Shown in FIGS. 4, 4A and 4B, is a preferred test room in which an interstitial test space 10'*a* is arranged and centered between adjacent exterior spaces 10'*b*, 10'*c*. The test space 10'*a* is defined by a plurality of truss members 20 spaced apart at an on-center spacing of twenty-four inches (24 in.). The truss members 20 space apart a lower ceiling 30 and an upper deck 32 by twelve inches (12 in.) to define a depth D1 of the interstitial space 10'*a*. Each truss member 20 includes a top chord, a bottom chord with one or more web members extending in between. Each truss was preferably constructed from trade size (2 in.×4 in.×3.5 in.) members.

Draft curtains 300 form a perimeter about the test space 10'*a* to separate the test space 10'*a* from the adjacent exterior spaces 10'*b*, 10'*c*. As shown in FIG. 4, a first pair of pair of spaced apart draft curtains 302 extend parallel to the plurality of truss members 20 to define the length L of the test area 10'*a* to be eighty feet 80 ft. A second pair of spaced apart draft curtains 304 extend perpendicular to the first pair of spaced apart draft curtains 302 define a width W of the test area 10'*a* to be twenty-four feet 24 ft. Accordingly, the draft curtains define a preferred perimeter P localized heat detection area 10'*a* of about 2000 sq. ft. (24 ft.×80 ft.) and form a preferred rectangular perimeter P. The draft curtains 300 preferably extend from the upper deck 30 into the interstitial test space 10'*a* to a preferred depth of eight inches (8 in.).

A piping network 110 extends in the space between the top and bottom chords of the truss members 20 to supply firefighting fluid to a plurality of spaced apart automatic fire protection test sprinklers 200. Within the interstitial test space 10'*a* is a central main supply line 112 that extends parallel to the truss members 20 with six parallel rows of branch line piping 114 extending perpendicularly from the central line 112 and are routed between the top and bottom chords of the truss members. A preferred working pressure of firefighting fluid that ranges from 7 psi. to 175 psi. is provided to the sprinklers. The branch pipes 114 are spaced apart from one another by a preferred branch spacing LL of 16 ft. Each branch pipe is configured to provide for a variety of sprinkler spacings. For testing, the branch pipes 114 (114*a*, 114*b*, 114*c* . . . ) provide for two sprinkler spacings along the branch line: eight feet (8 ft.) and sixteen feet (16 ft.). Coupled to each of the six branch lines 114 are a pair of test sprinklers 200. Each of the sprinklers (200*a*, 200*b*, 200*c* . . . ) are preferably upright automatic fire protection sprinklers defining a preferred maximum area of coverage of 256 sq. ft. to provide a preferred fluid flow density over the interstitial test area of at least 0.10 gpm/sq. ft. The sprinklers are installed with their deflectors at a maximum clearance distance CL1 of four inches (4 in.) from the upper deck 32. Installed in each the adjacent exterior areas 10'*b*, 10'*c* of the test-set up are a pair of target sprinklers 201*a*, 201*b* respectively spaced two feet from the draft curtains 304 at the ends of the test heat detection area 10*a*. The exterior target sprinklers 201*a*, 201*b* are preferably the same as the test sprinklers inside the test heat detection area 10'*a*.

Located in the test heat detection area is a fuel package or ignition source IS preferably constructed from a nominal eight to thirteen pounds (8-13 lbs.) wood crib made of four trade size (2 in.×2 in.) kiln-dried spruce of fir lumber 12 inches long placed on top of a (12 in.×12 in.×4 in.) pan containing 8 ounces of heptane and 16 ounces of water. Disposed about the fuel package on top of the truss members 20*a*, 20*b* adjacent the ignition source IS are stacked weight WGT corresponding to the mass truss design load of the truss members. Other than the draft curtains (or absence thereof) and truss member configurations described, the test fires can be conducted generally in a manner as outlined in UL 199H: Outline of Investigation for Fire Testing of Specific Application Sprinklers for Use in Horizontal Concealed Spaces (Feb. 17, 2014). Multiple fire tests were conducted in which the sprinklers were spaced: (i) at a 16 ft.×16 ft. spacing and (ii) at an 8 ft.×16 ft. spacing. For each spacing arrangement, the ignition source IS was ignited resulting in one or more test sprinklers actuating. Water was permitted to be discharged from the sprinkler for at least 30 minutes. The test sprinklers demonstrated sufficient concealed space protection performance by actuating in a timely manner and by sufficiently wetting the space and the ignition source IS such that the loaded truss members do not collapse and the exterior target sprinklers are not thermally operated. Similar fire tests can be conducted in a test set-up using a solid joist construction. Successful testing would show the sprinklers to actuate in a timely manner and wet the space and the ignition source IS such that the loaded support members of the joist system do not collapse and the exterior target sprinklers are not thermally operated Shown in FIGS. 5 and 5A-5C is an illustrative preferred embodiment of an automatic fire protection sprinkler 200 and fluid deflector 240 for use in the system 100. The sprinkler 200 is preferably embodied as an automatic sprinkler having a sprinkler frame 202 with a body 204 with an internal passageway having a fluid inlet 206 and an outlet 208 spaced apart from one another and axially aligned along a sprinkler axis A-A to define the sprinkler orifice and its discharge characteristics. As is known in the art, the discharge characteristics of a sprinkler is determined by its K-factor, which is defined by $K=Q/P^{1/2}$, where Q represents the flow rate (in gallons/min (GPM)) of water from the outlet of the internal passage through the sprinkler body and P represents the pressure (in pounds per square inch (psi) of water or firefighting fluid fed into the inlet end of the internal passageway though the sprinkler body. Generally, the discharge characteristics of the preferred sprinkler body 12 define a nominal K-factor of less than 14.0 [GPM/(psi.)$^{1/2}$] and more preferably in a range of 2.8-11.2 [GPM/(psi.)$^{1/2}$]. More particularly, preferred embodiments of sprinkler 200 define a nominal K-factor which is any one of 5.6, 8.0, or 11.2 [GPM/(psi.)$^{1/2}$] and even more preferably 5.6 [GPM/(psi)$^{1/2}$].

Figure 5:
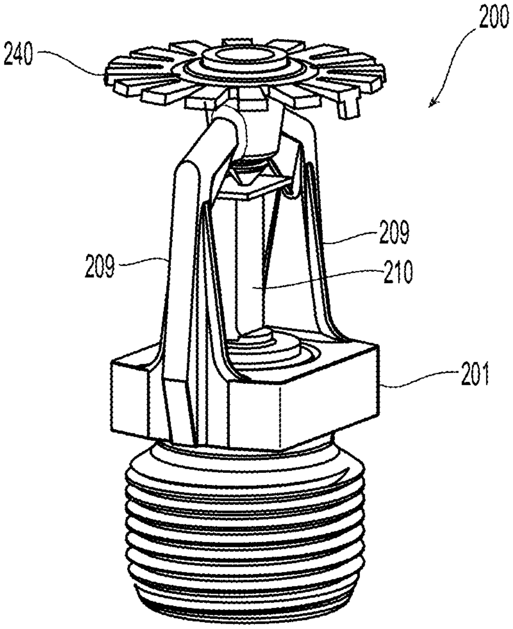
FIGS. 5 and 5A are isometric and cross-sectional views of a preferred embodiment of a sprinkler for use in the system of FIG. 1.
Figure 5A:
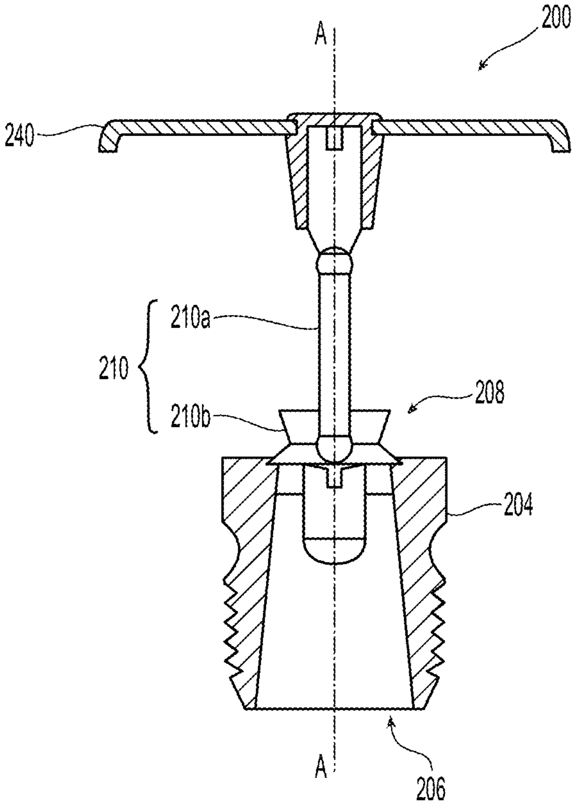

The sprinkler 200 includes a thermally responsive actuating assembly 210 to detect heat and thermally control fluid discharge from the sprinkler. The thermally responsive actuating assembly includes a heat sensitive trigger 210*a* and a closure assembly 210*b* to seal the outlet 208. The trigger 210*a* is preferably embodied as a thermally responsive frangible bulb, as illustrated in FIG. 5A, but can be alternatively configured as a thermally responsive soldered link assembly, such as for example, a soldered link assembly 210'*a* schematically shown in FIG. 5. The actuation, operation or thermal responsiveness of the sprinkler to fire or sufficient level of heat is preferably faster than standard response, e.g., quick response, fast response or early fast response, with a preferred response time index (RTI) of 50 (m*s)$^{1/2}$[100 (ft.*s)$^{1/2}$] or less, preferably no more than 36 (m*s)$^{1/2}$, [65 (ft.*s)$^{1/2}$], and even more preferably ranges from 19 to 36 (m*s)$^{1/2}$[35-65 (ft.*s)$^{1/2}$]. Accordingly, the sprinkler 200 is preferably a quick response sprinkler. The thermally responsive triggers of the sprinklers are preferably thermally rated in a range of 175° F. to 225° F. and more preferably are thermally rated to a nominal 200° F.

Figure 5B:
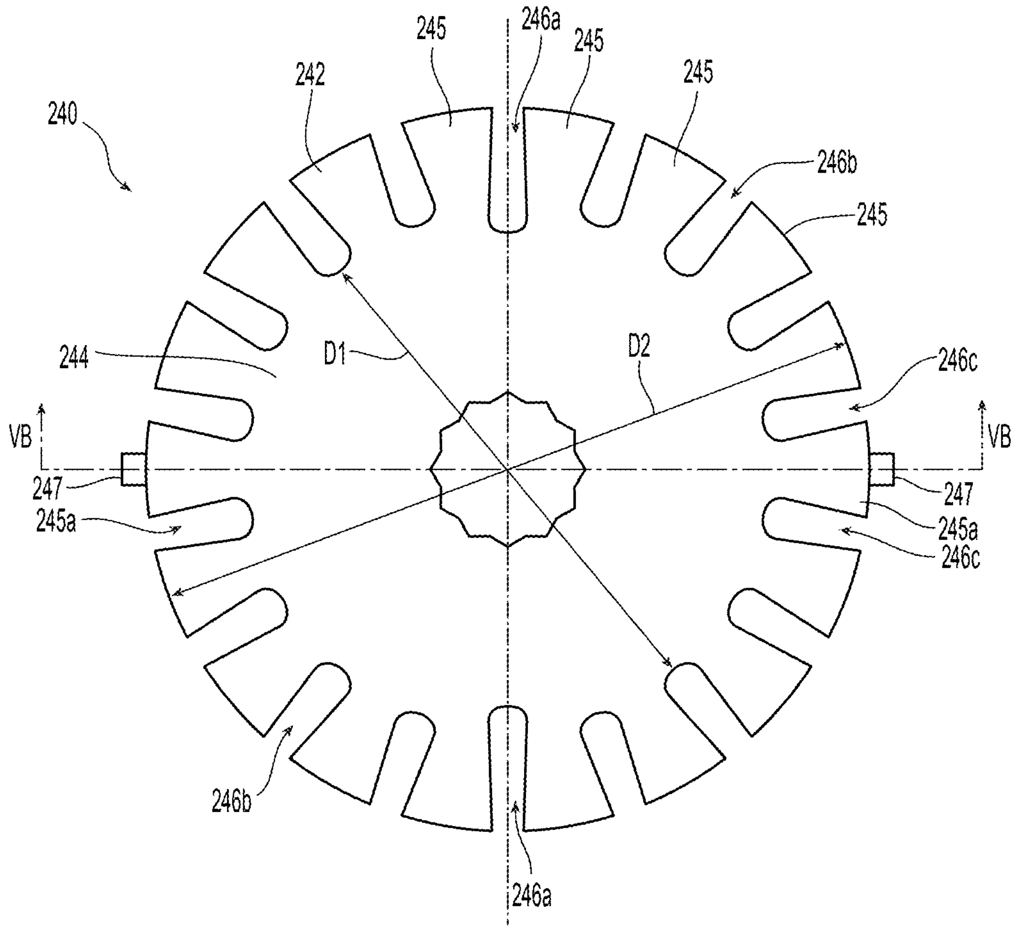
FIGS. 5B-5C are plan and cross-sectional views of a preferred fluid deflector for use in the sprinkler of FIG. 5.
Figure 5C:
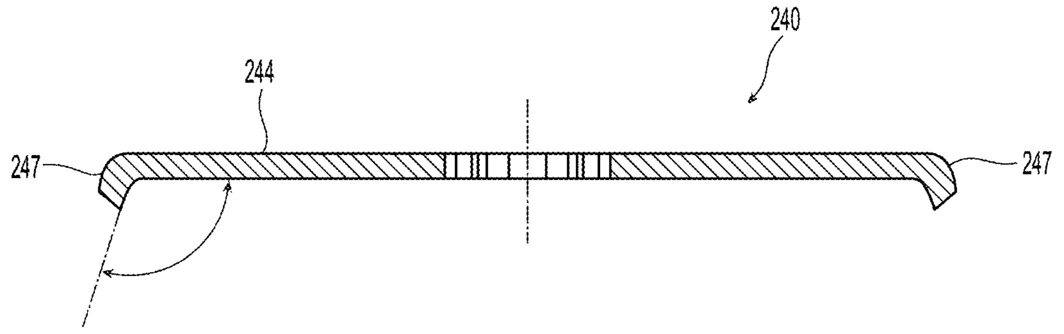

Preferred embodiments of the sprinkler 200 for use in the system 100 are preferably configured for installation in an upright type orientation with an appropriate fluid distribution deflector 240 coupled to a sprinkler frame 202 and spaced from the outlet 208 at fixed distance by a pair of frame arms 209. The distribution of fluid discharged from the sprinkler body 204 defines a preferred spray pattern and coverage of the sprinkler which defines the preferred sprinkler spacing of the sprinkler. As previously noted, the sprinklers of the system 100 preferably define a preferred sprinkler-to-sprinkler spacing of six to sixteen feet (6-16 ft.). A preferred embodiment of the fluid distribution deflector 240 is shown in FIG. 5B, 5C. The preferred deflector 240 is a substantially planar member defining a circular perimeter 242 and a central portion 244 with the deflector including a plurality of spaced apart tines 245 defining a plurality of opposed slot pairs 246 between adjacent tines 245. One or more opposed pair of tines 245*a* preferably include projections 247 that extend radially outward from the perimeter 242. The projections 247 preferably extends at a skewed angle with respect to the central portion 244 to distribute fluid downward with respect to the central portion 244. At the perimeter 242, the slots opening defines a first width for each slot; and each slot defines a slot length as the axial distance between the slot opening and a radiused portion between the slot opening and the central portion 244 of the deflector.

In preferred embodiments of the deflector 240, there are preferably at least three slot types 246*a*, 246*b*, 246*c* which are differentiated by their slot length and/or width configurations. For example, in preferred embodiments of the deflector member 240, slots of the first type 246*a* have a slot length different than the slot lengths of the second and third types 246*b*, 246*c*. In the deflector 240 shown, the terminal radiused portion of the slots of the second and third type 246*b*, 246*c* are preferably tangential to a common circle having a diameter D1. Moreover, the slots of the first and second types 246*a*. 246*b* have slot widths that vary over its length. In contrast, the slots of the third type 246*c* have a constant slot width. The spaced apart terminal ends of each tine define the perimeter 242. The perimeter 242 preferably defines a second diameter D2.

In a preferred embodiment of the fluid distribution deflector 240, the outer diameter D2 is preferably about 1.7 inch with the diameter D1 of the internal circle common to the slots 246*b* is preferably about 1.2 inch. The deflector 240 is preferably oriented on the sprinkler frame so that the longer slots of the first type 246*a* is aligned with the frame arms 209. The projections 247 are preferably disposed on a plane perpendicular to the slots of the first type 246*a*. Accordingly, the projections are preferably disposed perpendicular to the frame arms 209. For the preferred fluid deflector 240, there are a total of eighteen slots with preferably two slots of the first type 246*a*, fourteen slots of the second type and three types of the second type 246*b* with four slots of the third type 246*c*. Each of the slots of the first and second type 246*a*, 246*b* taper narrowly in the radially outward direction from the central portion 244 to the perimeter 242. Each slot of the third type 246*c* is preferably radially adjacent one of the projections 247. A preferred embodiment of the suppression sprinkler 20 for use in the system 10 includes a nominal K-factor of 5.6, a thermal sensitivity defined by an RTI of 50 (m*s)$^{1/2}$ [100 (ft.*s)$^{1/2}$] or less and a deflector 40, as previously described, is commercially available and described in Technical Data Sheet Form No. F_081216 Rev. 17.3: COIN Quick Response Upright Sprinkler VK950 (Specific Application) from The Viking Corporation of Hastings, MI.

Alternate embodiments of the deflector 240 can be used in an upright sprinkler for use in the system 100 provided the resulting deflector 240 can provide for concealed interstitial space performance as described herein. For example, the deflector perimeter 242 can define alternate geometries, such as for example, a non-circular geometry with more than one outer diameter. Additionally, alternate embodiments of the deflector can vary the number, arrangement and/or configuration of the slots. For example, the number of different slot lengths can be equal to the number of different type of slots. Instead of tapering narrowly in the radial outward direction, the slots may taper narrowly in the radially inward direction. Further in the alternative, the slot width in each slot can be constant over the slot length.

Figure 6:
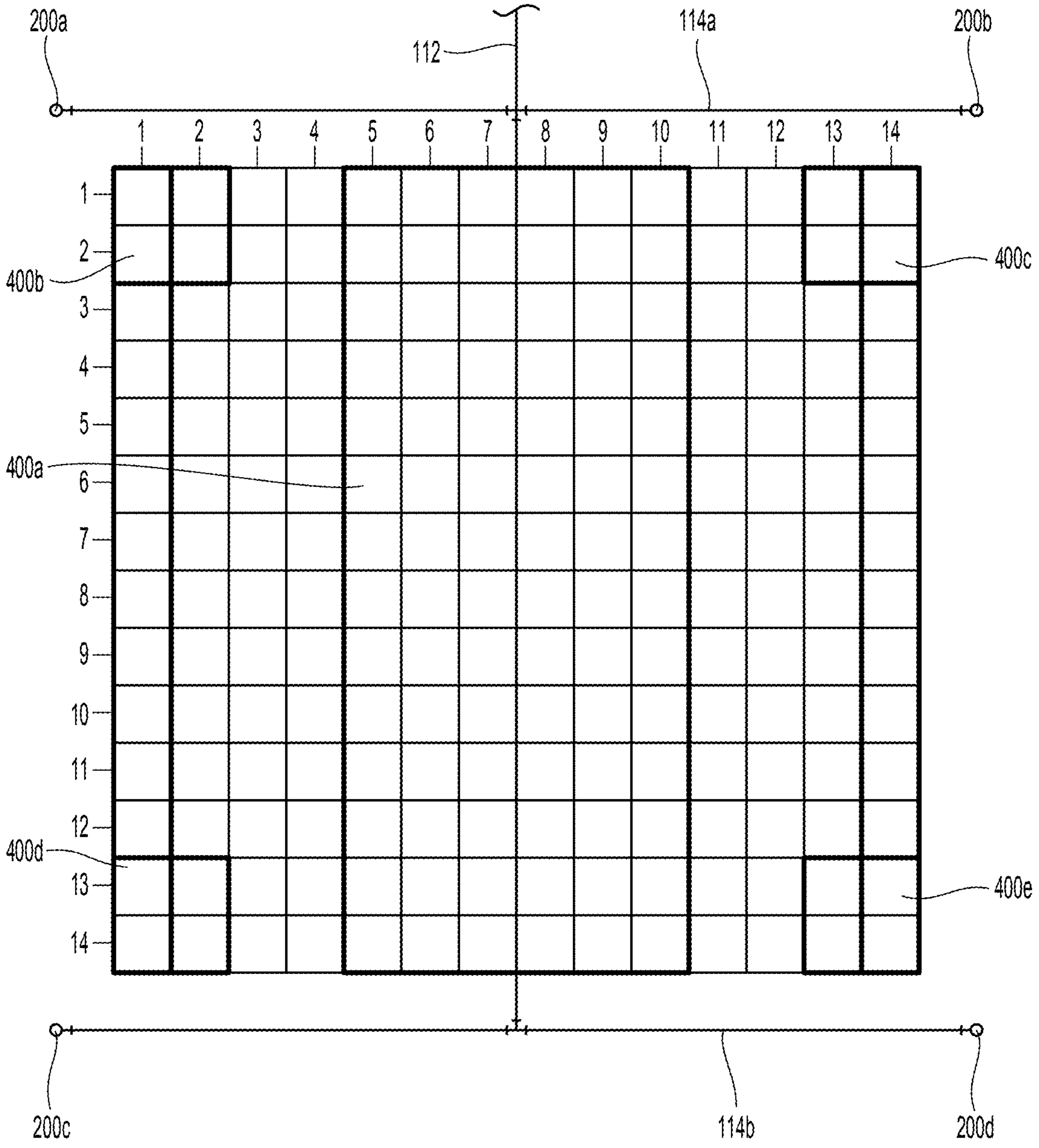
FIGS. 6 and 6A-6B are various views of a preferred fluid distribution test set-up.
Figure 6A:
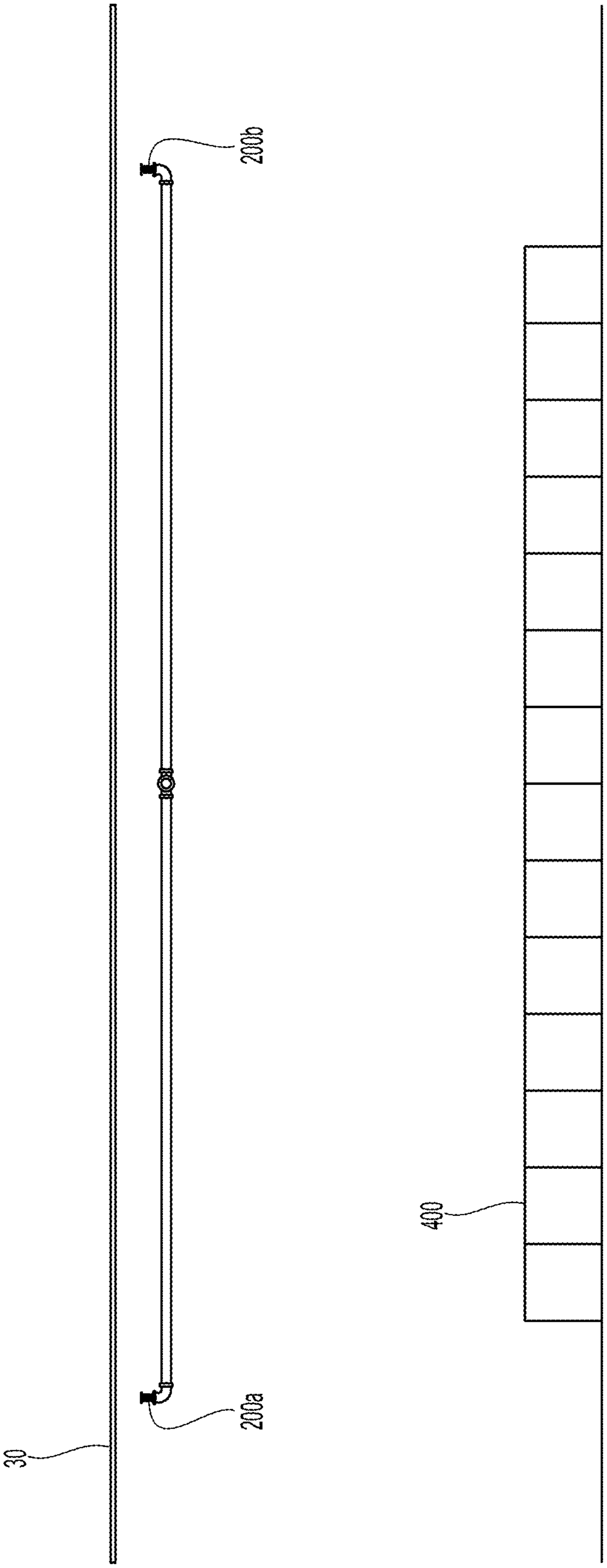

Preferred fluid distribution testing can be conducted to identify sprinklers for use in the preferred system 100. Preferred embodiments of the sprinklers 200 were subjected to such fluid distribution testing. Schematically shown in FIGS. 6 and 6A is a preferred fluid distribution test set-up in which four open (unsealed) sprinklers 200*a*, 200*b*, 200*c*, 200*d* are installed in a spaced apart relationship above an array of collection pans 400. The sprinklers 200*a*, 200*b*, 200*c*, 200*d* were spaced apart by their individual coverage area so as to define a preferred sprinkler-to-sprinkler spacing being one of 16 ft.×16 ft. or 16 ft.×8 ft. The sprinklers 200*a*, 200*b*, 200*c*, 200*d* were installed in pairs on two spaced apart branch lines 114*a*, 114*b* extending off of a central supply pipe 112. The preferred upright sprinklers 200 were installed with their deflectors located four inches (4 in.) below the ceiling 30 and five feet (5 ft.) above the collection pan array 400.

Water was supplied to the sprinklers at a preferred operating pressure and the water was discharged and collected in the collection pan array for a total of 10 minutes. For each collection pan, the delivery density was determined for each collection pan. The fluid distribution in particular collection pans or sub-arrays showed or indicated that the test sprinklers 200 could be used in the preferred concealed space systems to define a localized heat detection area of 2000 sq. ft. or larger. As seen in FIG. 6, the array 400 includes 196 collection pans each one cubic foot in volume (12 in.×12 in. 12 in.) arranged in a square 14×14 array centered between and below the four test sprinklers 200*a*, 200*b*, 200*c*, 200*d*. The array 400 captures the overlapping or intersecting quadrants of the spray patter of the four sprinklers 200*a*, 200*b*, 200*c*, 200*d* with one quadrant of the overlapping spray contributed by each sprinkler. Each collection pan is uniquely identified by the indicated grid. There is a central sub-array 400*a* that includes the rectangular collection pan from (5,1) to (10,14). The central sub-array array 400*a* captures the overlap of spray from sprinklers 200*a*, 200*b*, the overlap in spray from sprinklers 200*c*, 200*d* and the most central portion of the sub-array 400*a* covers the overlap of all four sprinklers 200*a*, 200*b*, 200*c*, 200*d*. In order to evaluate the fluid distribution of the sprinklers for concealed space performance, the individual densities within the central array 400*a* provide values that are equal to or between a preferred minimum and a maximum for a preferred sprinkler spacing and total fluid flow. Moreover, the densities of the central array 400*a* are within a preferred average for the preferred spacing and total fluid flow. For example, shown below in Table 1 are results from a series of four-sprinkler distribution testing showing the minimum, maximum and average densities for two preferred sprinkler-to-sprinkler spacings and fluid flow totals over the entire array collection pan array 400:

TABLE 1

| Sprinkler Spacing [(spacing on branch line ft.) × (spacing between branches ft.)] | Total Fluid Flow (GPM) | Minimum Over Array 400 (GPM/ Sq. ft.) | Maximum Over Array 400 (GPM/ Sq. ft.) | Average Over Array 400 (GPM/ Sq. ft.) |
|---|---|---|---|---|
| 16 ft. × 16 ft. | 104 | 0.04 | 0.19 | 0.12 |
| 8 ft. × 16 ft. | 60 | 0.03 | 0.21 | 0.09 |

Shown below in Table TA are results from a series of four-sprinkler distribution testing showing the preferred minimum, maximum and average densities for the central sub-array 400*a* for two preferred sprinkler-to-sprinkler spacings and fluid flow totals:

TABLE 1A

| Sprinkler Spacing [(spacing on branch line ft.) × (spacing between branches ft.)] | Total Fluid Flow (GPM) | Minimum in the Central Sub-Array 400a (GPM/ Sq. ft.) | Maximum in the Central Sub-Array 400a (GPM/ Sq. ft.) | Average in the Central Sub-Array 400a (GPM/ Sq. ft.) |
|---|---|---|---|---|
| 16 ft. × 16 ft. | 104 | 0.10 | 0.16 | 0.14 |
| 8 ft. × 16 ft. | 60 | 0.05 | 0.20 | 0.11 |

In comparative four-sprinkler distributing testing preferred embodiments of the sprinkler 200 provides for higher density distribution (minimums, maximums and averages) as compared to other concealed interstitial space sprinklers at similar spacing and fluid flows. Based on the four-sprinkler distribution testing results, preferred embodiments of the sprinkler provide preferred ranges of minimum, maximum and average densities summarized below in Table 2 over the entire collection array 400*a* for a range of sprinkler-to-sprinkler spacings and total flows:

TABLE 2

| Sprinkler Spacing [(spacing on branch line ft.) × (spacing between branches ft.)] | Total Fluid Flow (GPM) | Minimum Over Array 400 (GPM/ Sq. ft.) | Maximum Over Array 400 (GPM/ Sq. ft.) | Average Over Array 400 (GPM/ Sq. ft.) |
|---|---|---|---|---|
| 16 ft. × 16 ft. | 100-110 | 0.03-0.05 | 0.15-0.2 | 0.1-0.13 |
| 14 ft. × 16 ft. | 90-100 | 0.03-0.05 | 0.17-0.2 | 0.1-0.13 |
| 12 ft. × 16 ft. | 80-90 | 0.02-0.04 | 0.18-0.2 | 0.09-0.11 |
| 10 ft. × 16 ft. | 70-80 | 0.02-0.04 | 0.18-0.2 | 0.09-0.11 |
| 8 ft. × 16 ft. | 60-70 | 0.02-0.03 | 0.2-0.25 | 0.09-0.11 |
| 6 ft. × 16 ft. | 50-60 | 0.02-0.03 | 0.24-0.28 | 0.08-0.1 |
| 6 ft. × 6 ft. | 40-50 | 0.01-0.03 | 0.28-0.3 | 0.09-0.12 |

Summarized below in Table 2A are preferred ranges of minimum, maximum and average densities for the central sub-array 400*a* for a range of sprinkler-to-sprinkler spacings and total flows:

TABLE 2A

| Sprinkler Spacing [(spacing on branch line ft.) × (spacing between branches ft.)] | Total Fluid Flow (GPM) | Minimum in the Central Sub-Array 400a (GPM/ Sq. ft.) | Maximum in the Central Sub-Array 400a (GPM/ Sq. ft.) | Average in the Central Sub-Array 400a (GPM/ Sq. ft.) |
|---|---|---|---|---|
| 16 ft. × 16 ft. | 100-110 | 0.09-0.12 | 0.15-0.20 | 0.14-0.16 |
| 14 ft. × 16 ft. | 90-100 | 0.09-0.12 | 0.15-0.20 | 0.14-0.16 |

TABLE 2A-continued

| Sprinkler Spacing [(spacing on branch line ft.) × (spacing between branches ft.)] | Total Fluid Flow (GPM) | Minimum in the Central Sub-Array 400a (GPM/ Sq. ft.) | Maximum in the Central Sub-Array 400a (GPM/ Sq. ft.) | Average in the Central Sub-Array 400a (GPM/ Sq. ft.) |
|---|---|---|---|---|
| 12 ft. × 16 ft. | 80-90 | 0.06-0.08 | 0.15-0.20 | 0.12-0.14 |
| 10 ft. × 16 ft. | 70-80 | 0.06-0.08 | 0.20-0.25 | 0.1-0.12 |
| 8 ft. × 16 ft. | 60-70 | 0.04-0.06 | 0.20-0.25 | 0.09-0.12 |
| 6 ft. × 16 ft. | 50-60 | 0.04-0.06 | 0.25-0.30 | 0.08-0.11 |
| 6 ft. × 6 ft. | 40-50 | 0.04-0.06 | 0.30-0.35 | 0.08-0.11 |

Other sub-arrays of interest captured the fluid distribution in close proximity to the sprinkler 200. Shown in the 16 ft.×16 ft. sprinkler spacing of FIG. 6 are sub-arrays 400*b*, 400*c*, 400*d*, 400*e* at the four corners of the collection array 400 proximate sprinklers 200*a*, 200*b*, 200*c*, 200*d*. The sub-arrays are respectively preferably defined as 2×2 squares angled inwardly between the sprinklers and the central sub-array 400*a*. Shown in FIG. 6B in which the sprinklers 200'*a*, 200'*b*, 200'*c*, 200'*d* are in an 8 ft.×16 ft. sprinkler spacing, the sub-arrays 400'*b*, 400'*c*, 400'*d*, 400'*e* preferably partially overlap with the central sub-array 400'*a* at its corners. In one preferred aspect of concealed space performance testing, the corner sub-arrays 400*b*, 400*c*, 400*d*, 400*e* collect the lowest densities in the entire collection array 400, but collect a density that is at least ⅓ of the lowest density in the central array 400*a*. For example, shown below in Table 3 are density results for the preferred 16 ft.×16 ft. sprinkler-to-sprinkler spacings and fluid flow total:

TABLE 3

| Sprinkler Spacing [(spacing on branch line ft.) x (spacing between branches ft.)] | Total Fluid Flow (GPM) | Lowest Density in Central Array 400a (GPM/ Sq. ft.) | Lowest Density in Sub-Array 400b (GPM/ Sq. ft.) | Lowest Density in Sub-Array 400c (GPM/ Sq. ft.) | Lowest Density in Sub-Array 400d (GPM/ Sq. ft.) | Lowest Density in Sub-Array 400e (GPM/ Sq. ft.) |
|---|---|---|---|---|---|---|
| 16 ft. × 16 ft. | 104 | 0.12 | 0.04 | 0.04 | 0.04 | 0.04 |

Figure 6B:
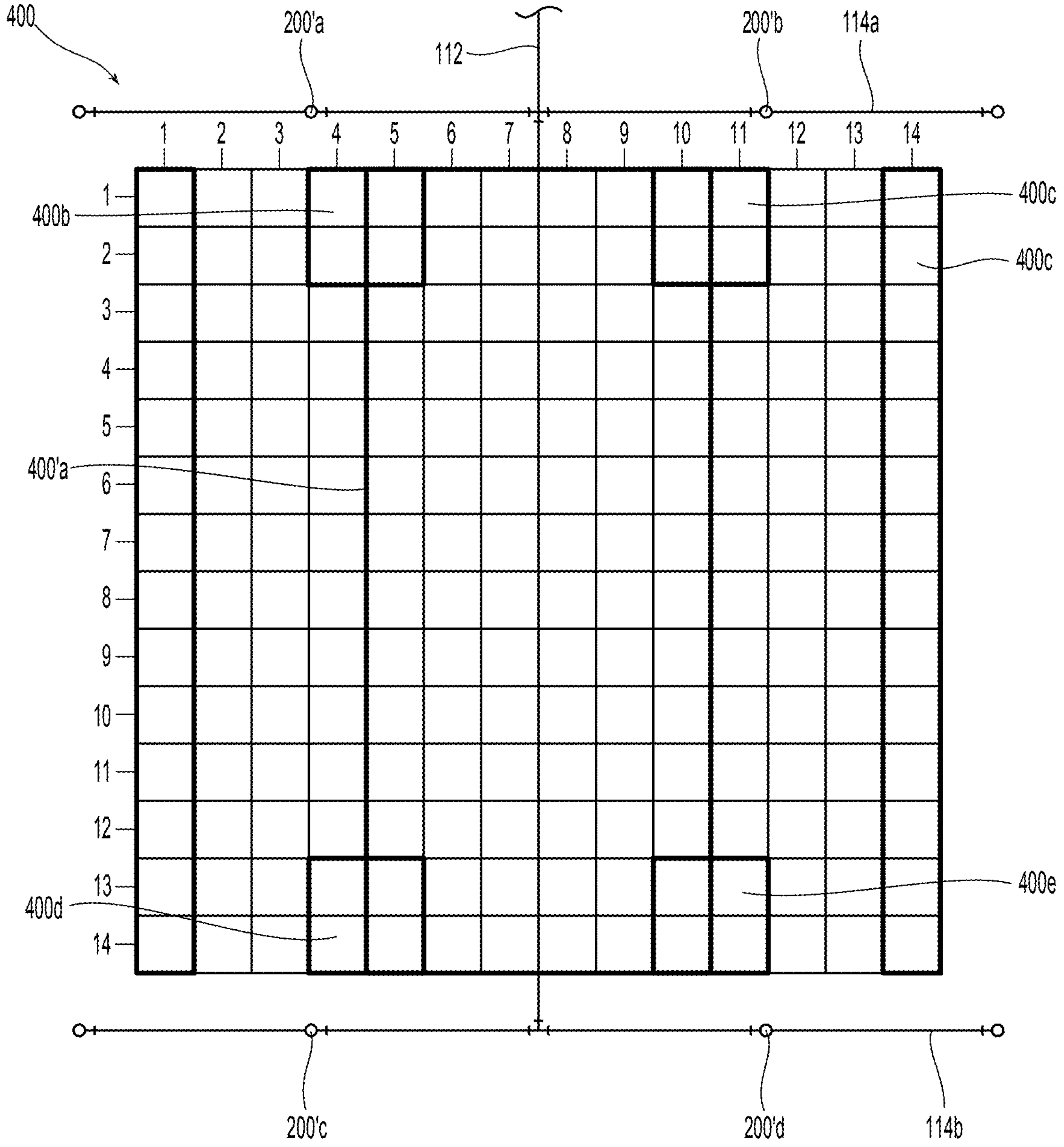

Shown in Table 4 are density results for the preferred 8 ft.×16 ft. sprinkler-to-sprinkler spacings of FIG. 6B and fluid flow total:

TABLE 4

| Sprinkler Spacing [(spacing on branch line ft.) x (spacing between branches ft.)] | Total Fluid Flow (GPM) | Lowest Density in Central Array 400'a (GPM/ Sq. ft.) | Lowest Density in Sub-Array 400'b (GPM/ Sq. ft.) | Lowest Density in Sub-Array 400'c (GPM/ Sq. ft.) | Lowest Density in Sub-Array 400'd (GPM/ Sq. ft.) | Lowest Density in Sub-Array 400'e (GPM/ Sq. ft.) |
|---|---|---|---|---|---|---|
| 8 ft. × 16 ft. | 60 | 0.05 | 0.05 | 0.05 | 0.05 | 0.05 |

Summarized below in Table 5 are preferred ranges of minimum densities for the corner sub-arrays 400*b*, 400*c*, 400*d*, 400*e* for a range of sprinkler-to-sprinkler spacings and total flows:

TABLE 5

| Sprinkler Spacing [(spacing on branch line ft.) x (spacing between branches ft.)] | Total Fluid Flow (GPM) | Lowest Density in Central Array 400'a (GPM/ Sq. ft.) | Lowest Density in Sub-Array 400'b (GPM/ Sq. ft.) | Lowest Density in Sub-Array 400'c (GPM/ Sq. ft.) | Lowest Density in Sub-Array 400'd (GPM/ Sq. ft.) | Lowest Density in Sub-Array 400'e (GPM/ Sq. ft.) |
|---|---|---|---|---|---|---|
| 16 ft. × 16 ft. | 100-110 | 0.10-0.12 | 0.03-0.12 | 0.03-0.12 | 0.03-0.12 | 0.03-0.12 |
| 14 ft. × 16 ft. | 90-100 | 0.10-0.12 | 0.03-0.12 | 0.03-0.12 | 0.03-0.12 | 0.03-0.12 |
| 12 ft. × 16 ft. | 80-90 | 0.06-0.08 | 0.02-0.08 | 0.02-0.08 | 0.02-0.08 | 0.02-0.08 |
| 10 ft. × 16 ft. | 70-80 | 0.06-0.08 | 0.02-0.08 | 0.02-0.08 | 0.02-0.08 | 0.02-0.08 |
| 8 ft. × 16 ft. | 60-70 | 0.04-0.06 | 0.01-0.06 | 0.01-0.06 | 0.01-0.06 | 0.01-0.06 |
| 6 ft. × 16 ft. | 50-60 | 0.04-0.06 | 0.01-0.06 | 0.01-0.06 | 0.01-0.06 | 0.01-0.06 |
| 6 ft. × 6 ft. | 40-50 | 0.04-0.06 | 0.01-0.06 | 0.01-0.06 | 0.01-0.06 | 0.01-0.06 |

Figure 7:
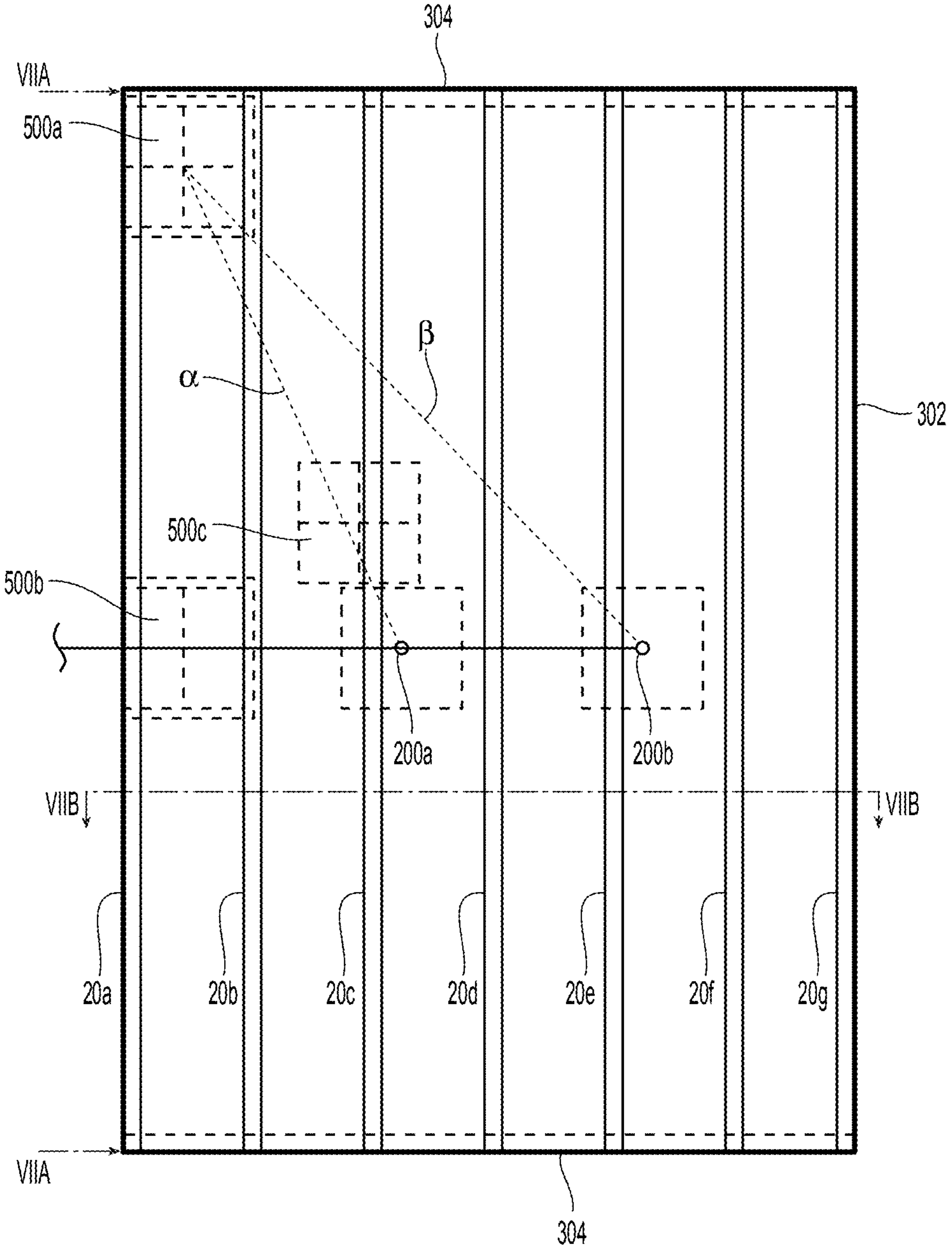
FIGS. 7 and 7A-7B are various views of another preferred fluid distribution test set-up.
Figure 7A:
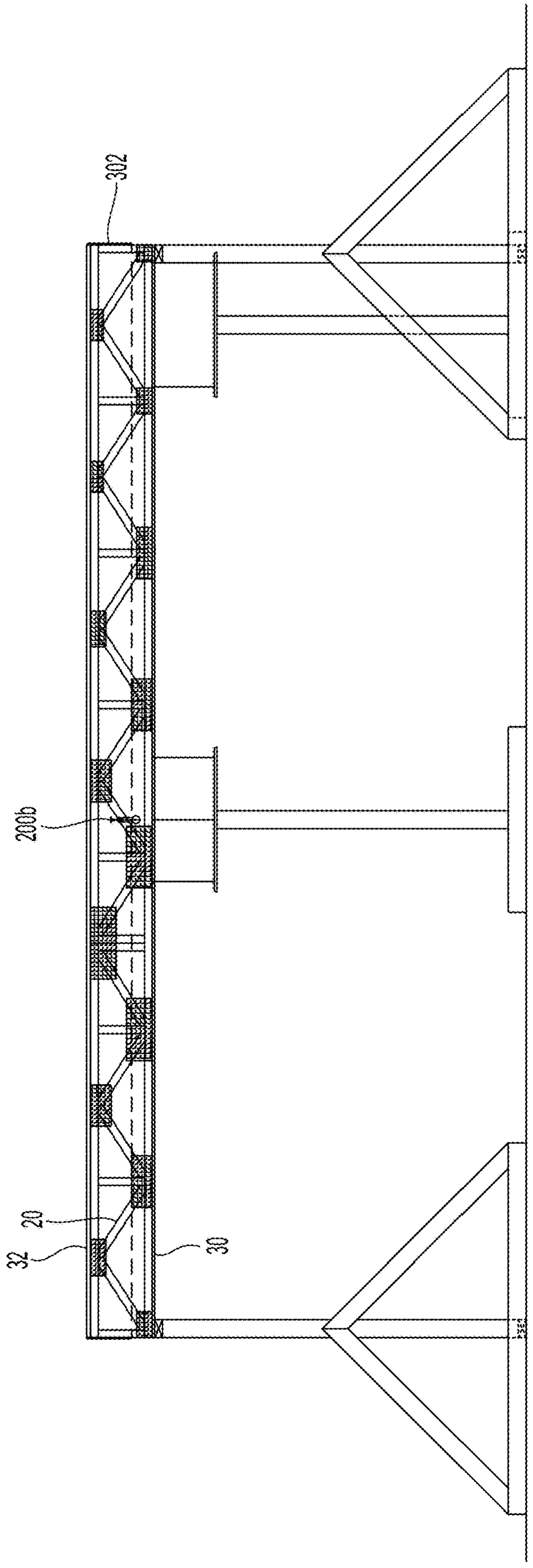
Figure 7B:
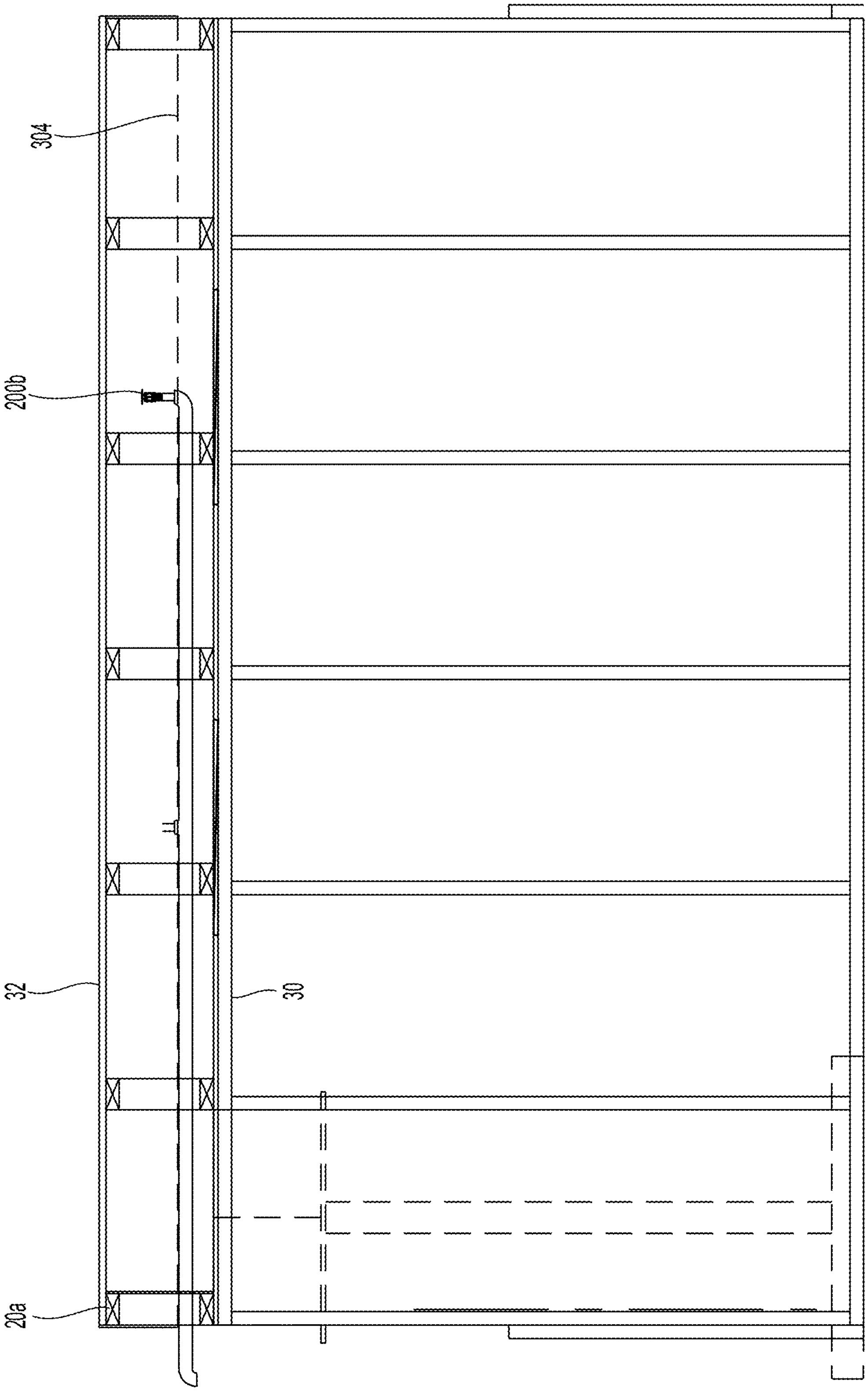

Another preferred fluid distribution test set-up and method for identifying sprinklers for interstitial concealed space fire protection is schematically shown in FIGS. 7 and 7A-7B. A 12 ft.×18 ft. simulated interstitial concealed test space 10" is constructed from seven support members (20*a*-20*g*) one foot (1 ft.) in depth evenly spaced parallel to one another to support a lower deck 30 and an upper deck 32 in a spaced apart relationship. Surrounding the perimeter of the test space 10" are draft curtains extending to a depth of eight inches from the upper deck 32. Bisecting the test space 10" is a fluid supply pipe 114 that extends below central angled web members 44 of the truss members 20 to simulate a branch supply line.

Coupled to the fluid supply pipe 114 are two test sprinklers 200*a*, 200*b* in a preferred spaced apart relationship ranging from 6 ft. to 16 ft. The preferred upright sprinklers are installed to locate the deflector of each sprinkler at a clearance distance of four inches (4 in.) from the upper deck 32. Positioned between the truss members are one or more 2×2 collection pan arrays 500. Each array is preferably made of four pans each one cubic foot pans (12 in.×12 in.×12 in.). A first collection array 500*a* is located in a corner of the test space 10" and centered between the first two truss members 20*a*, 20*b*. A second collection array 500*b* is also located between the first and second truss members 20*a*, 20*b* centered beneath the fluid supply pipe 114. The first sprinkler 200*a* is located between the third and truss members about four to eight feet (4-8 ft.) and preferably four feet from the first truss member 20*a* to simulate an 8 ft.×16 ft. localized heat detection space. The first sprinkler 200*a* is more preferably located laterally off-set by 4 inches from the third truss member 20*c*. To simulate a 16 ft.×16 ft. localized heat detection space, the second sprinkler 200*b* is located laterally about eight to sixteen feet (8-16) and more preferably about eight feet (8 ft.) from the first truss member 20*a* to define a preferred spacing from the first sprinkler 200*a* and off-set by 4 inches from the fifth truss member 20*e*.

A third collection pan array 500*c* is preferably located between the supply pipe 114 and the first collection array 500*a* to evaluate the spray distribution along the respective skewed paths a, 3 between the sprinklers 200*a*, 200*b* and the first collection array 400*a*. Moreover, the third collection pan array 500*c* is preferably with a radius of three feet (3 ft.) of the first sprinkler 200*a* and within a five foot (5 ft.) radius of the second sprinkler 200*b* with the third collection pan array 500*c* centered beneath third truss member 20*c*. Preferably, the sprinklers distribute into the third collection pan array 500*c* a density of at least 0.05 GPM/Sq. ft. along the skewed path a, 3 for a sprinkler spacing and operating pressure. In one preferred embodiment of the fluid distribution test, fluid discharge is controlled so as to selectively discharge water from one sprinkler at a time. Water is discharged from the sprinkler at a preferred flow rate for ten minutes and water is collected in the third collection pan array 500*c* alone or in combination with the first or second collection pan arrays 500*a*, 500*b*. Two fluid distribution tests were conducted for each of the first and second sprinklers 200*a*, 200*b* with one sprinkler spaced at about eight feet from the first trust member 20*a* and the other sprinkler spaced at about four feet from the first trust member 20*a*. The results are summarized below in Table 6.

TABLE 6

| Sprinkler Spacing From the first truss member (20a) | Total Fluid Flow from sprinkler (GPM) | Minimum Average Density (GPM/ Sq. ft.) | Actual Average Density in First Array 500a (GPM/ Sq. ft.) | Actual Average Density in Second Array 500b (GPM/ Sq. ft.) | Minimum Density in At Least One Pan in Second Array 500b (GPM/ Sq. ft.) | Actual Average Density in Third Array 500c (GPM/Sq. ft.) | Minimum Density in At Least One Pan in Second Array 500b (GPM/Sq. ft.) |
|---|---|---|---|---|---|---|---|
| 8 ft. | 26 | 0.05 | — | — | | 0.07 | 0.14 |
| 4 ft. | 15 | 0.05 | — | 0.24 | 0.02 | 0.19 | 0.33 |

Generally, distributions show that a preferred sprinkler provides a heavier fluid density in areas within a close in radius to the sprinkler, e.g., 4 ft. as compared to greater radii, e.g., 8 ft. Moreover, this relationship showed to hold regardless of the total fluid flow delivered to the sprinkler. Accordingly, the sprinkler did not distribute a recordable density of fluid in the second array 500*b* despite increasing the total fluid flow from 15 GPM to 26 GPM. In a preferred embodiment of the sprinkler, a maximum average density in the second collection pan array 500*b*, at about a four foot (4 ft.) radius from the sprinkler, is preferably no more than 0.25 GPM/sq. ft. and even more preferably includes a minimum fluid density as low as 0.02 GPM/sq. ft. in at least one pan in the second array 500*b*. Additionally or alternatively, a preferred embodiment of the sprinkler provides a minimum average density in the third collection pan array 500*c*, at about a four foot (4 ft.) radius from the sprinkler, that is preferably at least 0.15 GPM/sq. ft. and even more preferably includes a maximum fluid density of at least 0.3 GPM/sq. ft. in at least one pan in the third array 500*c*. In the preferred embodiment of the sprinkler, the sprinkler provides a minimum average density in the third array 500*c*, at about an eight foot (8 ft.) radius from the sprinkler, that is preferably greater than 0.05 GPM/sq. ft. and even more preferably includes a maximum fluid density of at least 0.14 GPM/sq. ft. in at least one pan in the third array 500*c*. In a comparative study of sprinklers, preferred sprinklers for the preferred system 100 provide higher densities in the third collection pan array 500*c* compared to other sprinklers while providing a lower density in the second collection pan array 500*b* as compared to the other sprinklers. Similar comparative fluid distribution tests can be conducted in a test set-up using a solid joist construction.

Having identified and verified a preferred sprinkler for protection of a concealed interstitial space by satisfying one or more of the previously described tests, methods of obtaining and providing a sprinkler for protection of a concealed interstitial space with a localized heat detection space of over 1000 sq. ft. are provided. Obtaining a preferred sprinkler can include any one of manufacturing, acquiring, testing, and/or qualifying the preferred sprinklers; and providing can include any one of selling, supplying, or specifying the preferred sprinkler including its installation in any one the preferred manners described herein. For example, one preferred method of supplying a concealed interstitial space fire protection system includes obtaining a plurality of upright sprinklers. Each sprinkler preferably including: a sprinkler body defining a nominal K-factor of 5.6, a thermally responsive trigger having a response time index (RTI) of 50 $(m\text{-}s)^{1/2}$ [100 $(ft.\text{-}s)^{1/2}$] or less, preferably no more than 36 $(m\ s)^{1/2}$, [65 $(ft.\text{-}s)^{1/2}$], and even more preferably 19 to 36 $(m\text{-}s)^{1/2}$½ [35-65 $(ft.\text{-}s)^{1/2}$]. The preferred method also preferably includes providing the plurality of sprinklers for installation to define a localized heat detection area of over 1000 sq. ft., preferably at least 1500 sq. ft., more preferably at least 2000 sq. ft. with draft curtains at its perimeter. Alternatively, or additionally, the preferred method provides for unconfined localized heat detection areas without the need for draft curtains.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of fire protection for a horizontal interstitial concealed space between a ceiling and an upper deck with a fire protection system, the horizontal interstitial concealed space consisting of wood truss or bar joist construction having a depth ranging from 6 inches to 60 inches, the fire protection system including a plurality of automatic upright fire protection sprinklers coupled to a network of CPVC pipes within the concealed space and filled with firefighting fluid in an unactuated state of the fire protection system to define a wet system, the plurality of automatic upright fire protection sprinklers being located at a sprinkler-to-sprinkler spacing ranging from 6 ft. to 16 ft. and having a hydraulic remote area, each of the plurality of upright fire protection sprinklers having a nominal K-factor of 5.6 gpm/(psi)½, a thermally sensitive actuating assembly, and a deflector having a central portion and a plurality of spaced apart tines, the method comprising:

locating the fire protection system within the concealed space with the hydraulic remote area defined as the greater of 1000 sq. ft. or 6 sprinklers, and providing in the concealed space a localized heat detection area equal to or greater than two thousand square feet (2,000 sq. ft.).

2. The method of claim 1, wherein providing in the concealed space the localized heat detection area comprises forming a perimeter about the localized heat detection area with a barrier.

3. The method of claim 1, wherein providing in the concealed space the localized heat detection area comprises forming an unconfined localized heat detection area.

4. The method of claim 3, wherein forming the unconfined localized heat a detection area comprises providing the localized heat detection area unconfined by barriers.

5. The method of claim 3, wherein each of the plurality of automatic upright fire protection sprinklers has a maximum area of coverage of 256 sq. ft.

6. The method of claim 5, wherein each of the plurality of automatic upright fire protection sprinklers provides a fluid flow density over the concealed space of at least 0.1 gpm/sq. ft.

7. The method of claim 2, wherein a top chord of the wood truss or bar joist construction comprises a chord depth greater than 4 inches.

8. The method of claim 7, wherein the wood truss or bar joist construction includes non-combustible insulation.

9. The method of claim 2, wherein a top chord of the wood truss or bar joist construction comprises a chord depth of 4 inches or less.

10. The method of claim 9, wherein the wood truss or bar joist construction excludes non-combustible insulation.

11. The method of claim 3, wherein a top chord of the wood truss or bar joist construction comprises a chord depth greater than 4 inches.

12. The method of claim 11, wherein the wood truss or bar joist construction includes non-combustible insulation.

13. The method of claim 3, wherein a top chord of the wood truss or bar joist construction comprises a chord depth of 4 inches or less.

14. The method of claim 13, wherein the wood truss or bar joist construction excludes non-combustible insulation.

15. The method of claim 1, wherein each of the upright fire protection sprinklers comprises a central sprinkler axis, and wherein the tines extend from a perimeter of the central portion radially with respect to the central sprinkler axis.

16. The method of claim 15, wherein the central portion comprise a planar central portion.

17. The method of claim 15, wherein at least two tines of the tines comprise a terminal end located along the central sprinkler axis at a location between an outlet orifice of a body of the upright fire protection sprinkler and the central portion of the deflector.

18. A method of fire protection for a horizontal interstitial concealed space between a ceiling and an upper deck with a fire protection system, the horizontal interstitial concealed space consisting of wood joist construction with non-combustible insulation having a depth ranging from 6 inches to 60 inches, the fire protection system including a plurality of automatic upright fire protection sprinklers coupled to a network of CPVC pipes within the concealed space and filled with firefighting fluid in an unactuated state of the fire protection system to define a wet system, the plurality of automatic upright fire protection sprinklers being located at a sprinkler-to-sprinkler spacing ranging from 6 ft. to 16 ft. and having a hydraulic remote area, each of the plurality of upright fire protection sprinklers having a nominal K-factor of 5.6 gpm/(psi)½, a thermally sensitive actuating assembly, and a deflector having a central portion and a plurality of spaced apart tines, the method comprising:

locating the fire protection system within the concealed space with the hydraulic remote area defined as the greater of 1000 sq. ft. or 6 sprinklers, and providing in the concealed space a localized heat detection area equal to or greater than two thousand square feet (2,000 sq. ft.).

19. The method of claim 18, wherein providing in the concealed space the localized a heat detection area comprises forming a perimeter about the localized heat detection area with a barrier.

20. The method of claim 19, wherein providing in the concealed space the localized heat detection area comprises forming an unconfined localized heat detection area.

21. The method of claim 20, wherein forming the unconfined localized heat detection area comprises providing the localized heat detection area unconfined by barriers.

22. The method of claim 20, wherein the wood joist construction comprises solid wood joists.

23. The method of claim 20, wherein each of the plurality of automatic upright fire protection sprinklers has a maximum area of coverage of 256 sq. ft.

24. The method of claim 20, wherein each of the plurality of automatic upright fire protection sprinklers provides a fluid flow density over the concealed space of at least 0.1 gpm/sq. ft.

25. The method of claim 18, wherein each of the upright fire protection sprinklers comprises a central sprinkler axis, and wherein the tines extend from a perimeter of the central portion radially with respect to the central sprinkler axis.

26. The method of claim 25, wherein the central portion comprise a planar central portion.

27. The method of claim 25, wherein at least two tines of the tines comprise a terminal end located along the central sprinkler axis at a location between an outlet orifice of a body of the upright fire protection sprinkler and the central portion of the deflector.

28. A method of fire protection for a horizontal interstitial concealed space having a depth ranging from 6 inches to 60 inches, the horizontal interstitial concealed space consisting of wood truss or bar joist or wood joist construction with non-combustible insulation, the method comprising:

obtaining a plurality of upright automatic fire protection sprinklers, each of the plurality of upright fire protection sprinklers having a nominal K-factor of 5.6 GPM/(psi)½, a thermally sensitive actuating assembly, and a deflector having a central portion and a plurality of spaced apart tines, and providing the plurality of automatic fire protection sprinklers for installation in a fire protection system within the horizontal interstitial concealed space, the fire protection system includes the plurality of automatic upright fire protection sprinklers coupled to a network of CPVC pipes at a sprinkler-to-sprinkler spacing ranging from 6 ft. to 16 within the concealed space and filled with firefighting fluid in an unactuated state of the system to define a wet system, wherein the plurality of automatic upright fire protection sprinklers comprises a hydraulic remote area defined by the greater of 1000 sq. ft. or 6 sprinklers, and wherein the concealed space comprises a localized heat detection area equal to or greater than two thousand square feet (2,000 sq. ft.).

29. The method of claim 28, wherein the localized heat detection area comprises a barrier at a perimeter of the localized heat detection area, wherein each of the plurality of automatic upright fire protection sprinklers has a maximum area of coverage of 256 sq. ft., wherein each of the plurality of automatic upright fire protection sprinklers provides a fluid flow density over the concealed space of at least 0.1 gpm/sq. ft., wherein each of the upright fire protection sprinklers comprises a central sprinkler axis, and wherein the tines extend from a perimeter of the central portion radially with respect to the central sprinkler axis.

30. The method of claim 28, wherein the localized heat detection area comprises an unconfined localized heat detection area, wherein each of the plurality of automatic upright fire protection sprinklers has a maximum area of coverage of 256 sq. ft., wherein each of the plurality of automatic upright fire protection sprinklers provides a fluid flow density over the concealed space of at least 0.1 gpm/sq. ft., wherein each of the upright fire protection sprinklers comprises a central sprinkler axis, and wherein the tines extend from a perimeter of the central portion radially with respect to the central sprinkler axis.

* * * * *